United States Patent
Murade

(10) Patent No.: US 6,762,809 B1
(45) Date of Patent: Jul. 13, 2004

(54) ELECTRO-OPTICAL DEVICE AND METHOD FOR MANUFACTURING THE SAME

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 515 days.

(21) Appl. No.: 09/667,233

(22) Filed: Sep. 22, 2000

(30) Foreign Application Priority Data

Sep. 30, 1999 (JP) ............................................ 11-280818
Jul. 18, 2000 (JP) ........................................ 2000-217416

(51) Int. Cl.⁷ ...................... G02F 1/1337; G02F 1/1333
(52) U.S. Cl. ........................... 349/110; 349/126; 349/44
(58) Field of Search ................................ 349/123, 126, 349/138, 110, 44, 141

(56) References Cited

U.S. PATENT DOCUMENTS 6,211,937 B1 * 4/2001 Miyachi et al. ............. 349/156
6,433,841 B1    8/2002 Murade et al.

FOREIGN PATENT DOCUMENTS

| JP | 01-266512 | 10/1989 |
|----|-----------|---------|
| JP | 03-037625 | 2/1991 |
| JP | 04-090514 | 3/1992 |
| JP | 04-305625 | 10/1992 |
| JP | 05-027249 | 2/1993 |
| JP | 05-313185 | 11/1993 |
| JP | 06-194685 | 7/1994 |
| JP | 06-265934 | 9/1994 |
| JP | 06-265934 A | 9/1994 |
| JP | 06-273802 | 9/1994 |
| JP | 08-110517 A | 4/1996 |
| JP | 08-110517 | 4/1996 |
| JP | 11-218781 A | 8/1999 |
| KR | 96-15037 | 10/1988 |

* cited by examiner

Primary Examiner—Toan Ton
(74) Attorney, Agent, or Firm—Oliff & Berridge, PLC

(57) ABSTRACT

An electro-optical device includes pixel electrodes formed on a TFT array substrate and a counter electrode formed on a counter substrate. A data line is buried in a groove formed in the TFT array substrate for planarization. A projection and a hollow portion are formed by burying a capacitance line, rather than a scanning line, into the groove. A downwardly rubbed portion, which is downwardly rubbed, of inclined surfaces of the projection and the hollow portion, is covered with a light-shielding layer, and upwardly rubbed portions are covered with no light-shielding layer. With this arrangement, the electro-optical device provides a high pixel aperture ratio and presents a high-contrast and bright image by reducing an orientation defect of a liquid crystal resulting from a step portion in the surface of the substrate facing the liquid crystal.

8 Claims, 14 Drawing Sheets

[FIG. 1]
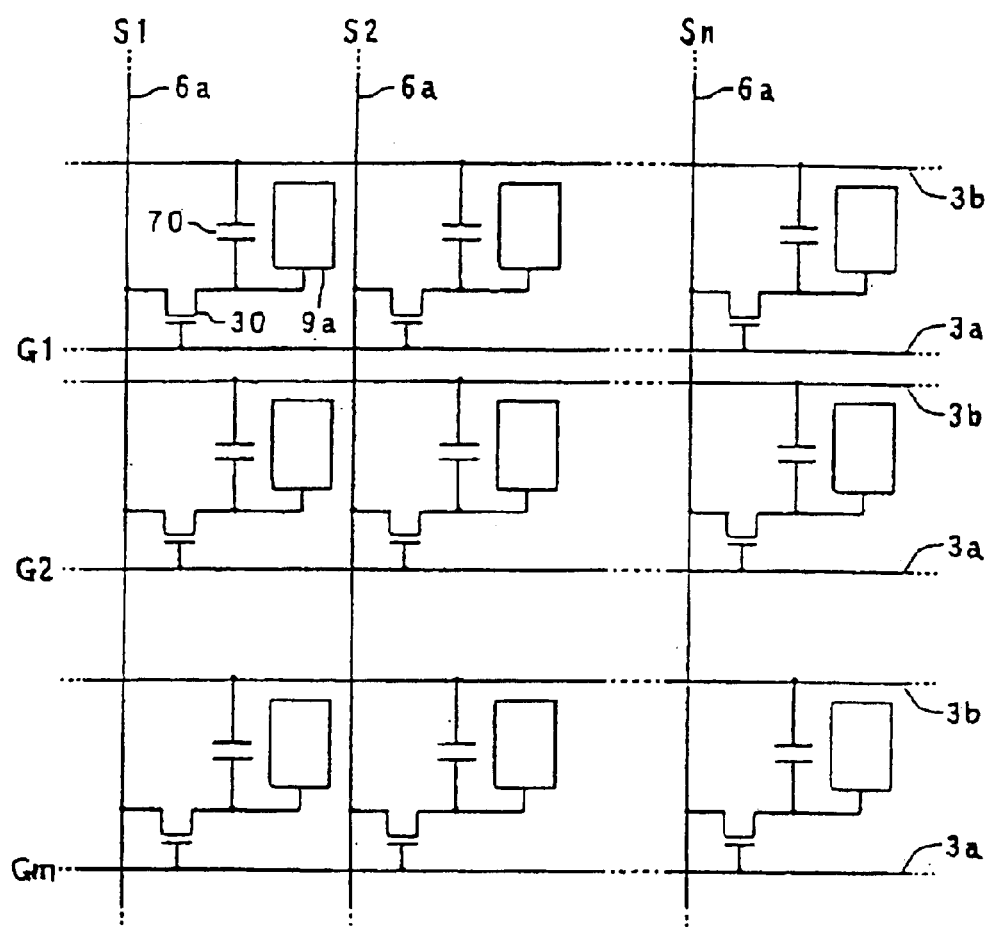

[FIG. 2]
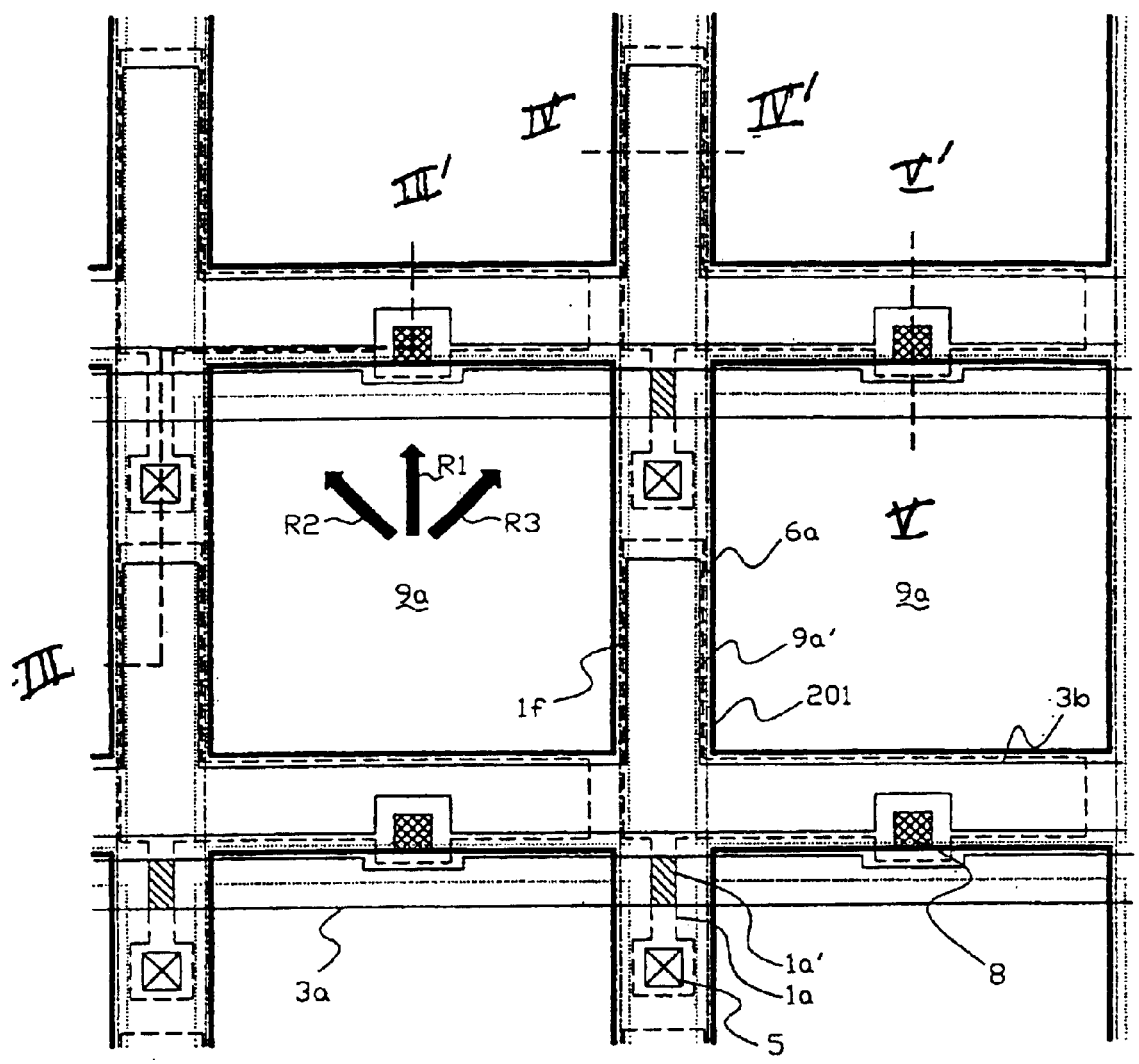

[FIG. 3]
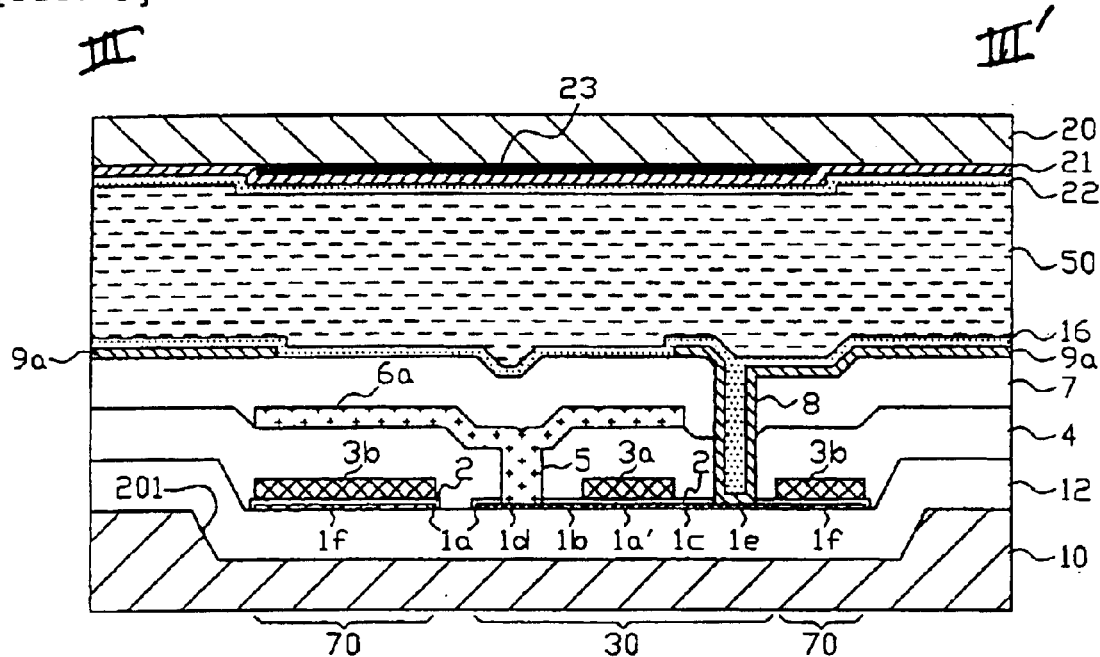
[FIG. 4]
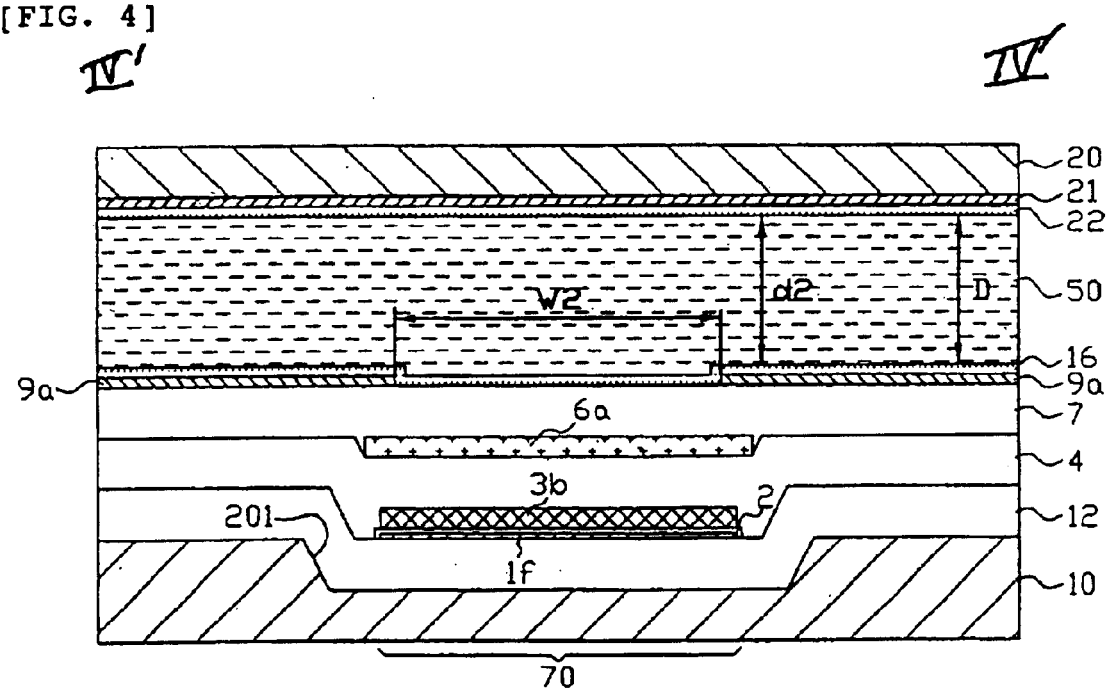

[FIG. 5]
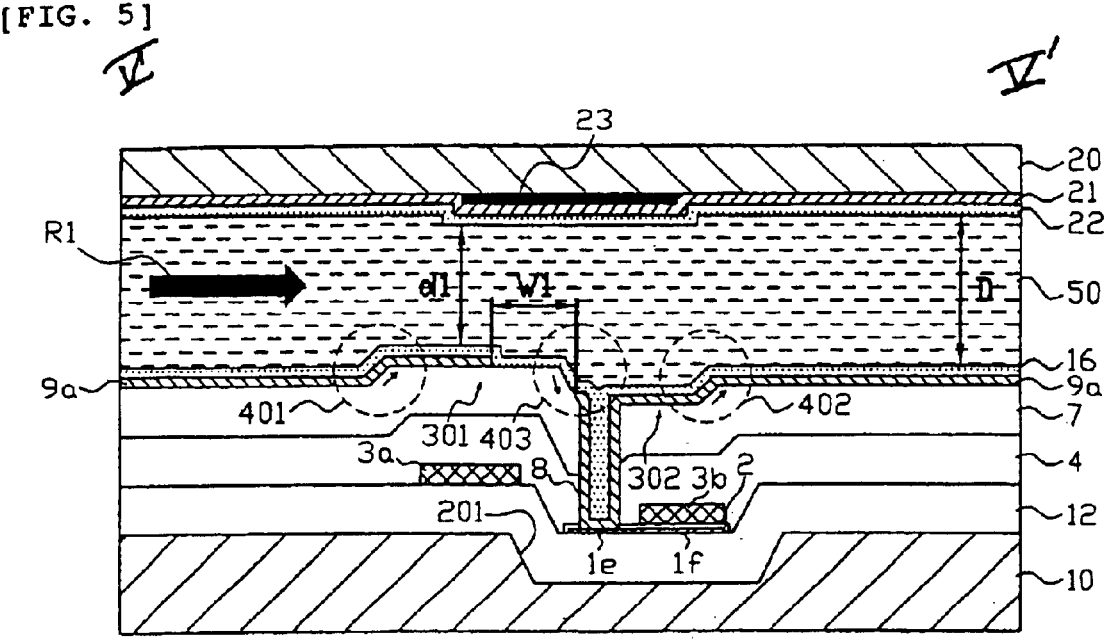

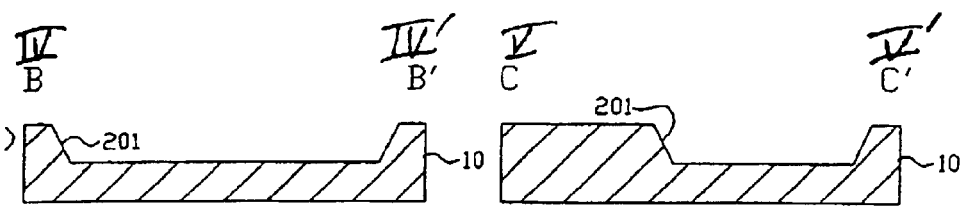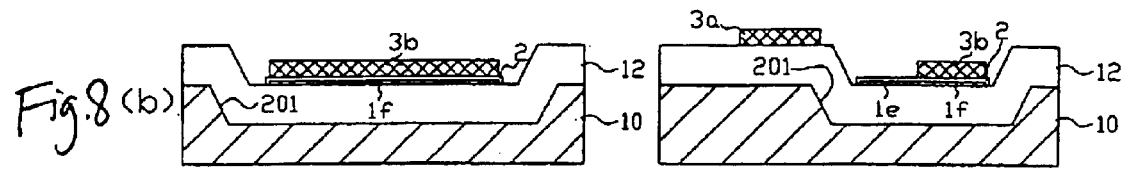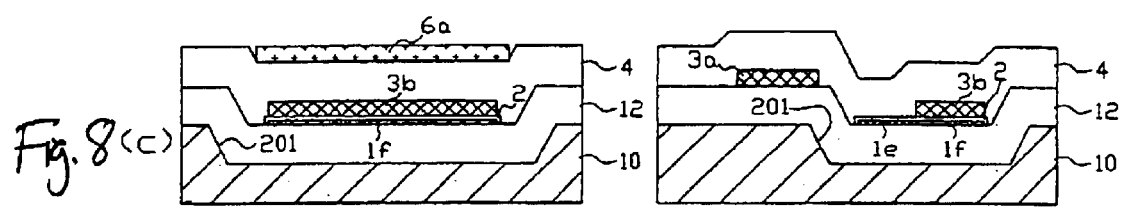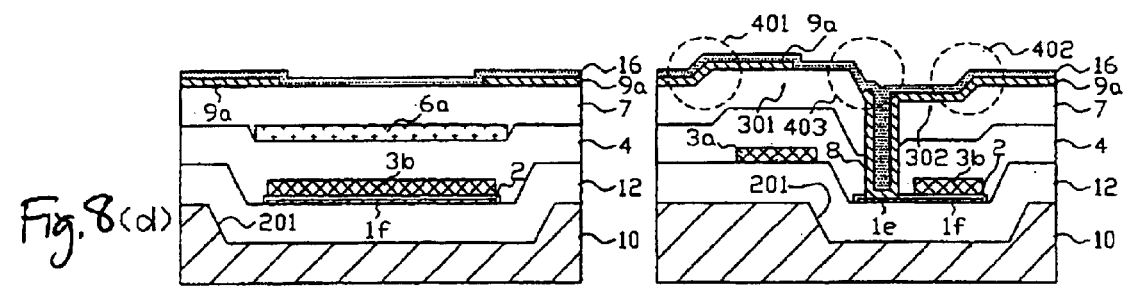

[FIG. 9]
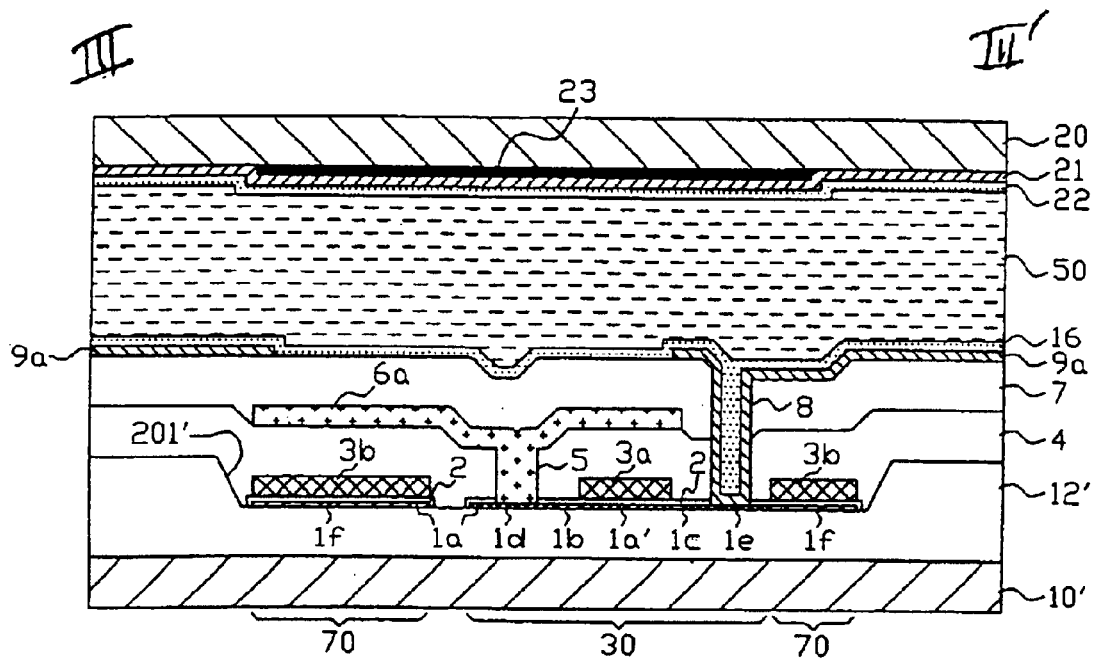
[FIG. 10]
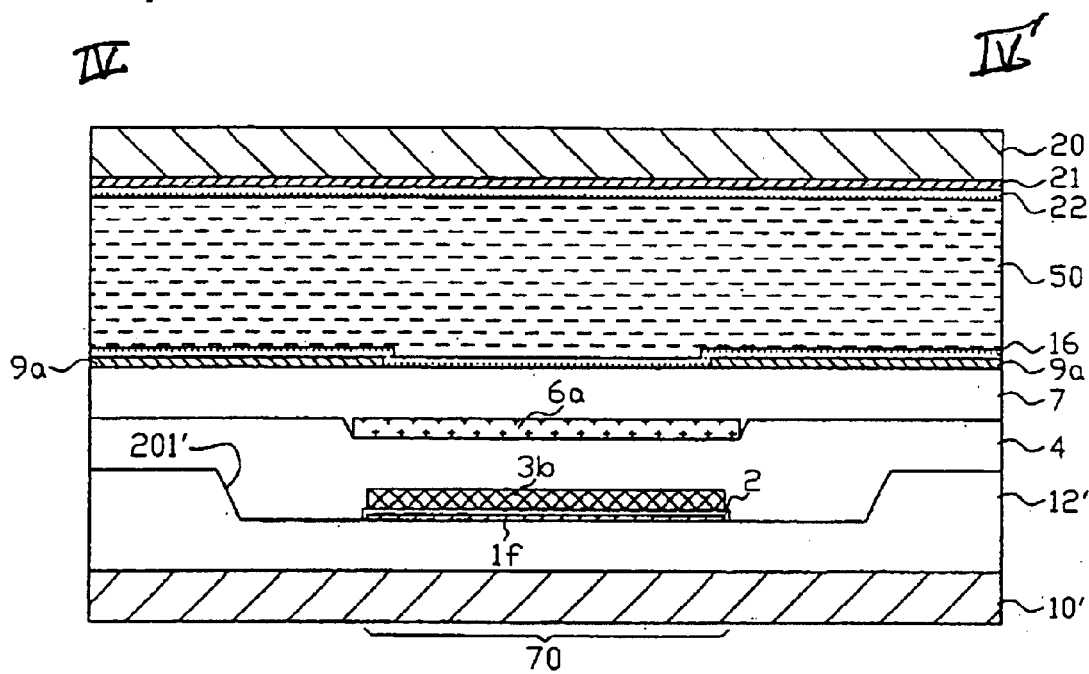

[FIG. 11]
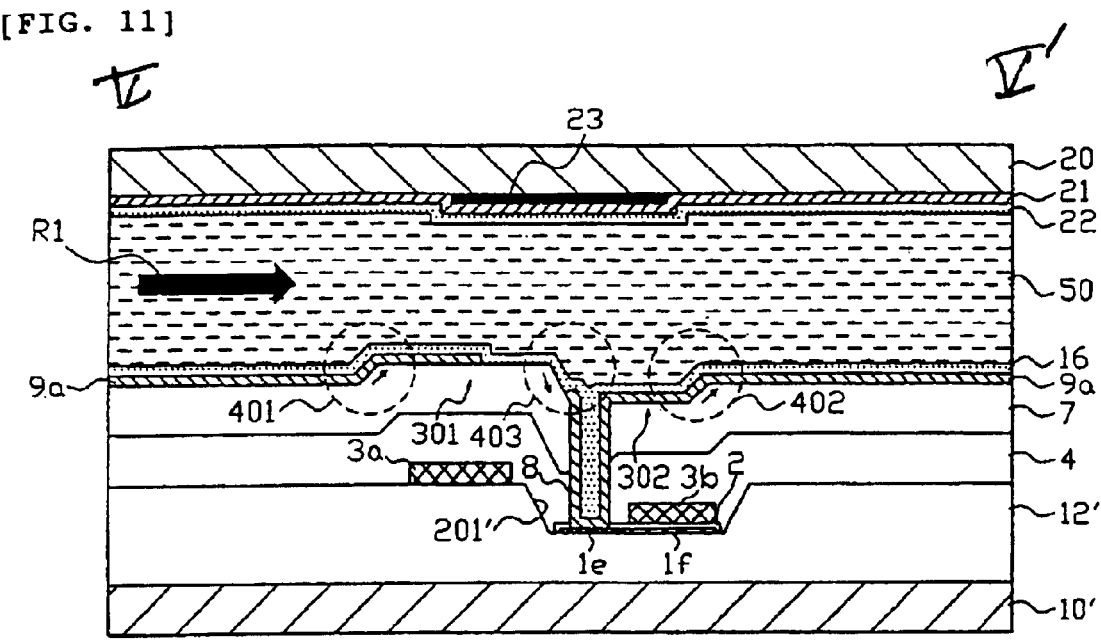

[FIG. 13]
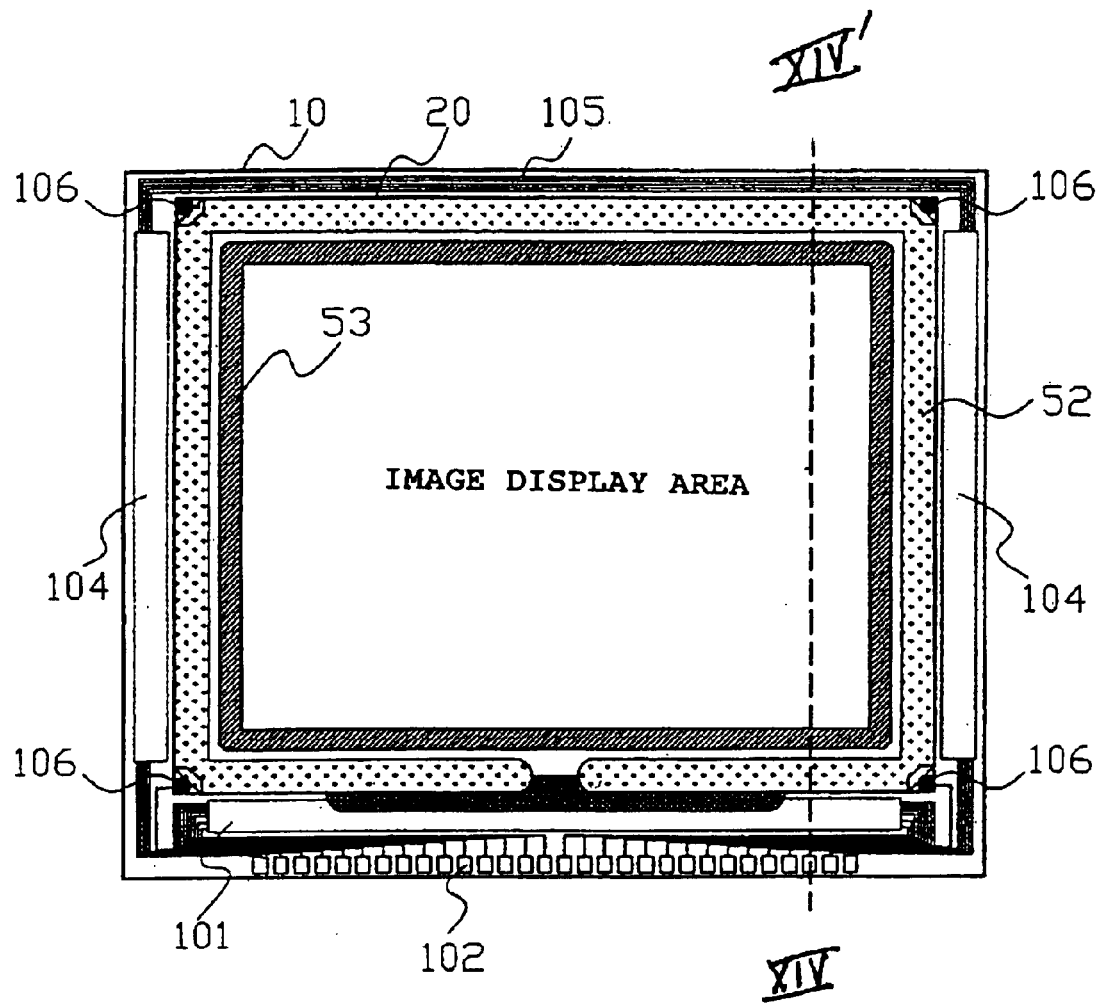
[FIG. 14]
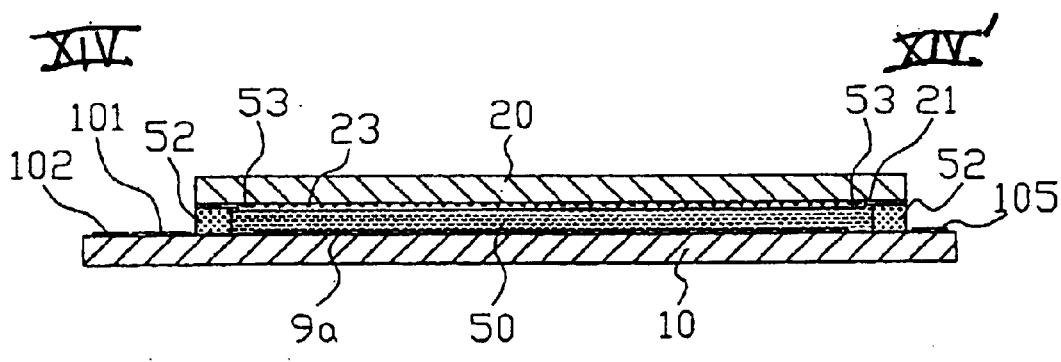

[FIG. 15]
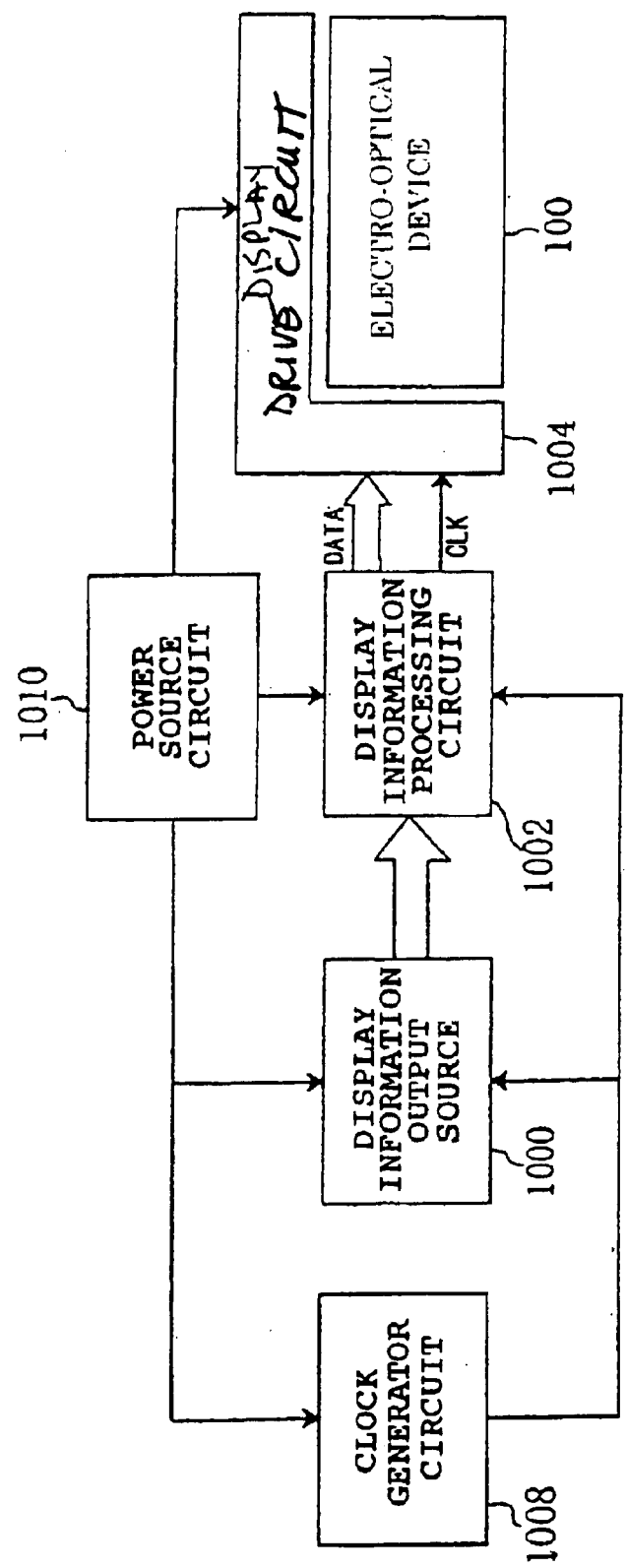

[FIG. 16]
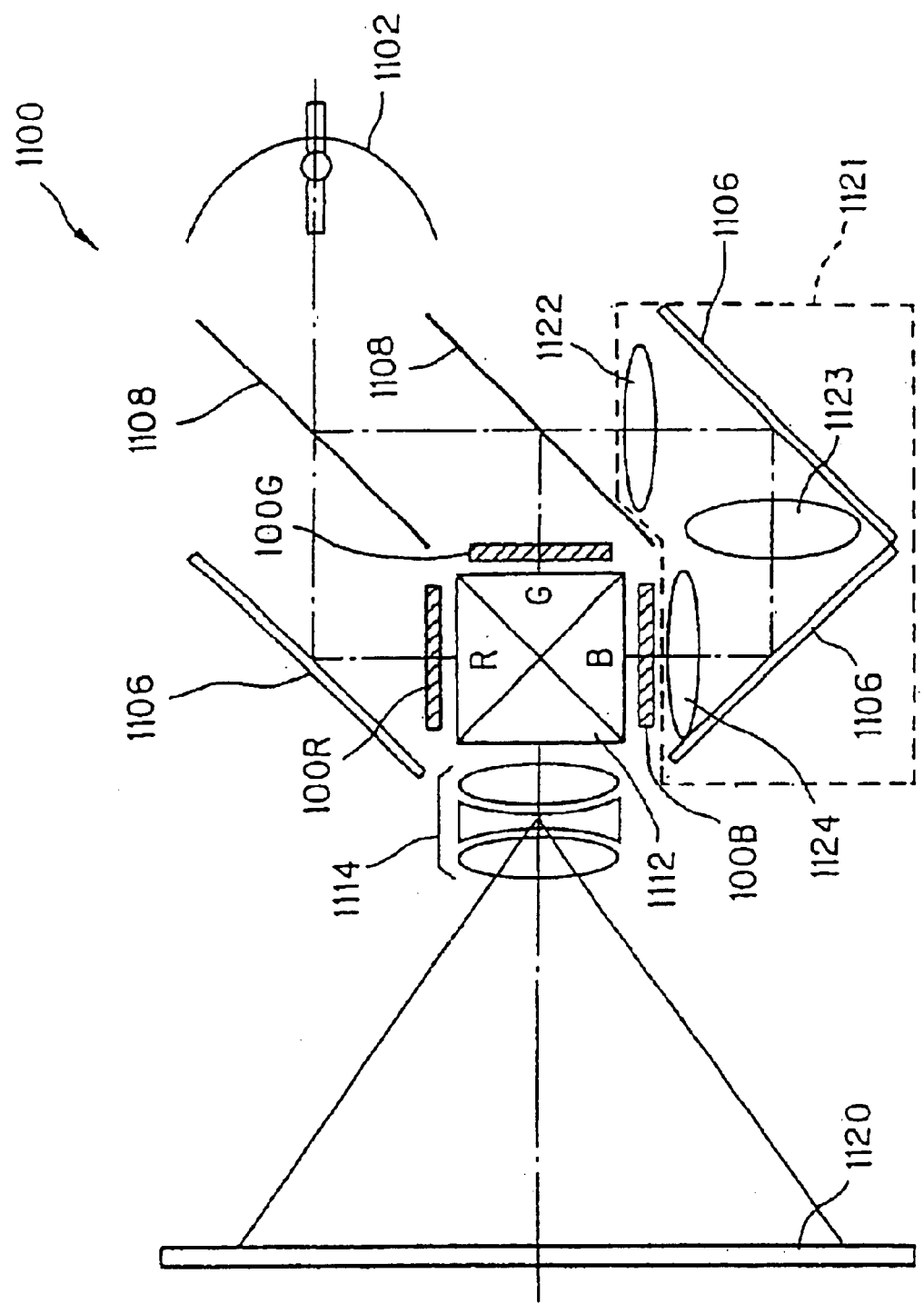

[FIG. 17]
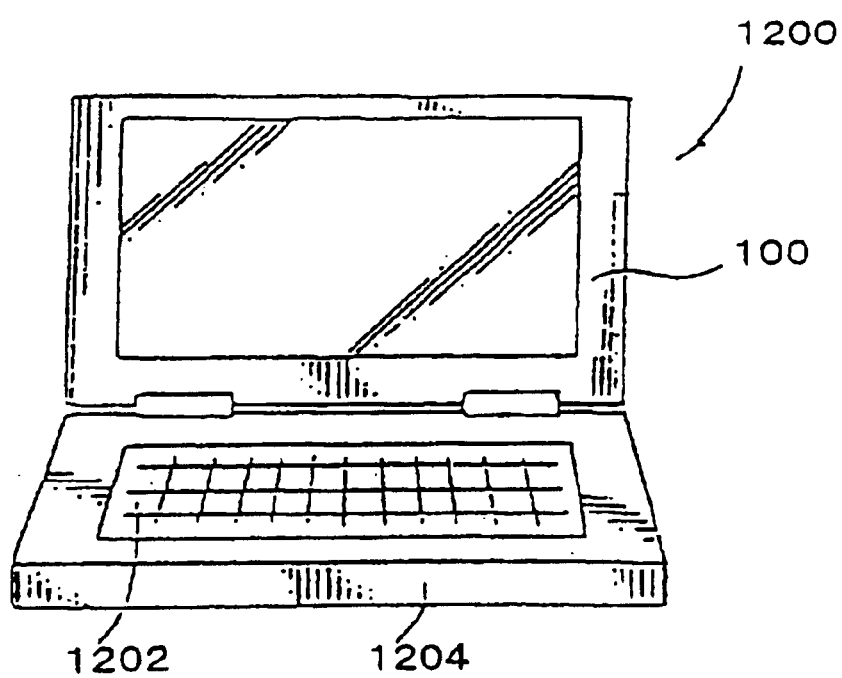

ELECTRO-OPTICAL DEVICE AND METHOD FOR MANUFACTURING THE SAME

BACKGROUND OF THE INVENTION

1. Field of Invention

The present invention relates to the technical field of an electro-optical device such as a liquid-crystal display device, and a method for manufacturing the electro-optical device. More particularly, the present invention relates to the technical field on an electro-optical device and a method for manufacturing the electro-optical device, which is appropriate for use in liquid-crystal display devices employing a TN (Twisted Nematic) liquid crystal, in particular, a thin-film transistor (hereinafter referred as TFT) active-matrix liquid-crystal display device, which adopts an alternating drive method in which the polarities of the potentials applied to adjacent pixel electrodes are periodically alternated every pixel row or every pixel column, so that the potentials applied to adjacent pixel electrodes in a row direction or in a column direction are inverted in polarity.

2. Description of Related Art

Electro-optical devices, such as liquid-crystal display devices, typically include an electro-optical material such as a liquid crystal interposed between a pair of substrates, and the alignment state of the electro-optical material is controlled by the property of the electro-optical material and an alignment layer formed on the substrate on its surface facing the electro-optical material. If there is a step in the surface of the alignment layer, an orientation defect occurs in the electro-optical material depending on the magnitude of the step. If such an orientation defect occurs, proper driving of the electro-optical material in that portion becomes difficult, and the contrast ratio of the device drops due to a visible defect in the electro-optical device. Since a TFT active-matrix electro-optical device includes, on a TFT array substrate, TFTs in many locations thereof for controlling and switching a variety of lines such as scanning lines, data lines, and capacitance lines, and includes pixel electrodes, a step inevitably occurs in the surface of an alignment layer in accordance with the presence of lines and elements, if no planarizing process is performed.

Conventionally, the portion of the substrate suffering from such a step is aligned with the spacing between adjacent pixel electrodes, and a light-shielding layer covers the portion of the step so that the portion of the electro-optical material suffering from the orientation defect may remain hidden or may not contribute to display light.

The electro-optical device of this sort typically adopts an alternating drive method in which the polarity of a potential applied to the pixel electrodes is alternated at a predetermined pattern to prevent degray scale of the electro-optical material as a result of the application of a direct current, and to control cross talk and flickering of a display screen image.

A 1H alternating drive method is relatively easy to control and presents a high-quality image display. During the presentation of a video signal of one frame or one field, the pixel electrodes arranged on an odd row are driven by a positive potential, while the pixel electrodes arranged on an even row are driven by a negative potential. During the presentation of a video signal of a next frame or a next field, conversely, the pixel electrodes arranged on the even row are driven by a positive potential while the pixel electrodes arranged on the odd row are driven by a negative potential, and at the same time, the potential polarity is alternated every row in the period of frame or field.

A 1S alternating drive method is also easy to control and presents a high-quality image display. The pixel electrodes on the same column are driven by the same polarity potential while the potential polarity is alternated every column in the period of frame or field.

SUMMARY OF THE INVENTION

The technique to cover the above-referenced step portion with the light-shielding layer narrows the aperture of the pixel depending on the size of the step portion, and cannot meet the basic requirement in the technical field of the electro-optical device that the aperture ratio of the pixel be increased in a limited image display area to present a brighter image. The number of lines and TFTs per unit area increases as the pixel pitch becomes fine for high-definition video presentation. Since there is a limitation to the miniaturization of the lines and the TFTs, the ratio of the step portion to the image display area becomes relatively high, and the problem of the step portion becomes serious as high-definition design is promoted in the electro-optical device.

In accordance with the above-referenced technique for planarizing the interlayer insulator beneath the pixel electrodes, no particular problem will be presented when adjacent pixel electrodes are of the same potential in a TFT array substrate. When the potentials (the potentials applied to the pixel electrodes adjacent in the column direction in the 1H alternating drive method, and the potentials applied to the pixel electrodes adjacent in the row direction in the 1S alternating drive method) are opposite in polarity as in the above-referenced 1H alternating drive method or 1S alternating drive method, the gap between the pixel electrode and the counter electrode becomes wider at the edge of the pixel electrode over the line and the TFT when the planarizing process is performed than when no planarizing process is performed. A transverse electric field taking place between the adjacent pixel electrodes (specifically, an electric field in parallel with the surface of the substrate or slant electric field having a component in parallel with the surface of the substrate) relatively intensifies. If such a transverse electric field is applied to the electro-optical material, which is expected to work under a longitudinal electric field present between the pixel electrodes and the counter electrode (i.e., an electric field perpendicular to the surface of the substrate), a disclination takes place in the electro-optical material, visible defect occurs there, and the contrast ratio drops. Although the area of the transverse electric field can be covered with the light-shielding layer, the aperture area of the pixel is reduced along with an increase in the area of the transverse electric field. As the distance between the adjacent pixel electrodes shrinks with a fine pixel pitch, the transverse electric field intensifies, and these become more problematic as high-definition design is promoted in the electro-optical device.

The present invention has been developed in view of at least the above problems. It is an object of the present invention to provide an electro-optical device, such as a liquid-crystal display device, which presents a high aperture ratio of pixel and displays a high-contrast-ratio, bright and high-quality image by controlling an orientation defect resulting from a step portion in the surface of a substrate in contact with an electro-optical material, such as a liquid crystal, while by keeping the aperture area of each pixel from narrowing as much as possible.

An electro-optical device of a first exemplary embodiment of the present invention includes a first substrate having a first alignment layer that has been subjected to a rubbing process; a second substrate opposed to the first substrate, having a second alignment layer that has been subjected to a rubbing process; an electro-optical material interposed between the first substrate and the second substrate; a step portion, formed on at least one of the first alignment layer of the first substrate and the second alignment layer of the second substrate, and downwardly rubbed in the direction of the rubbing process; and a light-shielding layer formed in an area facing the step portion that is downwardly rubbed in the direction of the rubbing process, on at least one of the first substrate and the second substrate.

The study carried out by the inventors of this invention reveals that an orientation defect of an electro-optical material due to a step is substantially more pronounced when a rubbing process is performed in a downward direction than when a rubbing process is performed in an upward direction. Specifically, a relatively good orientation is expected in an upwardly rubbed portion regardless of a step, while the step causes a substantial orientation defect in a downwardly rubbed portion. This is attributed to the fact that upwardly rubbing and flat-surface rubbing actions tend to result in similar interactions between an alignment layer which results from the rubbing process and defines an alignment state of the electro-optical material and the electro-optical material, while downwardly rubbing and flat-surface rubbing actions tend to result in unsimilar interactions.

The area facing the step portion that is downwardly rubbed is light-shielded by the light-shielding layer in the present invention. Although an orientation defect takes place in the electro-optical material in the downwardly rubbed portion, the downwardly rubbed portion is light-shielded in an non-aperture area of each pixel, and no visible defect occurs. In other words, a drop in contrast ratio due to the orientation defect is prevented by light-shielding the downwardly rubbed portion.

To cover an orientation defect in the electro-optical material due to the step in the downwardly rubbed portion, the light-shielding layer is preferably set to be slightly wider in width than the downwardly rubbed portion.

The step portion may be at a projection that is formed to extend in a direction intersecting the direction of the rubbing process.

The projection is preferably formed in an area that corresponds to a spacing between adjacent pixel electrodes that are driven in mutually different polarities.

With this arrangement, a longitudinal electric field on the projection is intensified, while a transverse electric field taking place between pixel electrodes is weakened.

An electro-optical device such as a matrix driving liquid-crystal display device may use a 1H alternating drive method and a 1S alternating drive method as an alternating drive manner.

Preferably, the upwardly rubbed portion of the projection which is upwardly rubbed in the direction of the rubbing process is not opposed to the light-shielding layer.

The upwardly rubbed portion is a portion that contributes to presentation without causing a visible defect, and the aperture ratio of pixel is increased without lowering the contrast ratio by leaving the upwardly rubbed portion unshielded as much as possible.

The step portion may be at a hollow portion that is formed to extend in a direction intersecting the direction of the rubbing process.

The hollow portion may be a groove formed in one of the first substrate and the second substrate, and a line may be arranged in the area of the groove.

The upwardly rubbed portion of the hollow portion which is upwardly rubbed in the direction of the rubbing process is not opposed to the light-shielding layer, and the aperture ratio of pixel is thus increased without lowering the contrast ratio.

An area of the substrate corresponding to the spacing between adjacent pixel electrodes which are driven in the same polarity is preferably subjected to a planarizing process.

Almost no orientation defect occurs in the electro-optical material due to the step portion between the pixel electrodes by the planarization. To light-shield the area, a narrow light-shielding layer works. The pixel aperture ratio is even more increased.

The planarizing process may be performed by forming a groove in the substrate and arranging a line in the area of the groove.

The line may be a data line of a light-shielding film fabricated of Al (aluminum), for instance, and in this area, a light-shielding feature is imparted to the data line.

The distance between the adjacent pixel electrodes which are driven in the same polarity is preferably larger than the layer thickness of the electro-optical material.

This arrangement controls in the electro-optical material the disclination which is generated by the transverse electric field.

The direction of the rubbing process may be perpendicular to the downwardly rubbed portion of the step portion, or slant to the downwardly rubbed portion of the step portion.

An electro-optical device of a second exemplary embodiment of the present invention includes a first substrate having a first alignment layer that has been subjected to a rubbing process; a second substrate opposed to the first substrate, having a second alignment layer that has been subjected to a rubbing process; a liquid crystal interposed between the first substrate and the second substrate, a portion of the liquid crystal having a reverse tilt angle, and formed on the surface of at least one of the first alignment layer of the first substrate and the second alignment layer of the second substrate; and a light-shielding layer formed in an area facing the portion of the liquid crystal having the reverse tilt angle, on at least one of the first substrate and the second substrate.

The electro-optical device of this exemplary embodiment of the present invention increases the pixel aperture ratio without lowering the contrast ratio, by light-shielding the portion of the liquid crystal having the reverse tilt angle.

An electro-optical device of a third exemplary embodiment of the present invention includes a first substrate having a plurality of pixel electrodes and a first alignment layer that has been subjected to a rubbing process; a second substrate opposed to the first substrate, having a counter electrode and a second alignment layer that has been subjected to a rubbing process; an electro-optical material interposed between the first substrate and the second substrate; a step portion formed on the surface of the first alignment layer in an area corresponding to a spacing between the pixel electrodes on the first substrate, and downwardly rubbed in the direction of the rubbing process; and a light-shielding layer formed in an area facing the step portion that is downwardly rubbed in the direction of the rubbing process, on at least one of the first substrate and the second substrate.

An electro-optical device of a fourth exemplary embodiment of exemplary embodiment of the present invention includes a first substrate having a plurality of pixel electrodes and a first alignment layer that has been subjected to a rubbing process; a second substrate opposed to the first substrate, having a counter electrode and a second alignment layer that has been subjected to a rubbing process; an electro-optical material interposed between the first substrate and the second substrate; a light-shielding layer formed at least on one of the first substrate and the second substrate and defining a pixel area; and a step portion having an upwardly rubbed portion in the direction of the rubbing process, the upwardly rubbed portion being formed in the vicinity of the area facing the light-shielding layer on the surface of the first alignment layer on the first substrate.

The electro-optical device of this exemplary embodiment of the present invention increases the pixel aperture ratio without lowering the contrast ratio, by leaving the upwardly rubbed portion unshielded as much as possible.

An electro-optical device of a fifth exemplary embodiment of the present invention includes a first substrate, formed of a plurality of layers including a first alignment layer that has been subjected to a rubbing process and having a plurality of pixel electrodes; a second substrate opposed to the first substrate, having a counter electrode and a second alignment layer that has been subjected to a rubbing process; an electro-optical material interposed between the first substrate and the second substrate; a groove formed on the first substrate; a line arranged along the groove; a step portion formed on the surface of the alignment layer in the area of the groove; and a light-shielding layer formed in an area facing the step portion that is downwardly rubbed, at least on one of the first substrate and the second substrate, wherein the direction of the rubbing process of the first substrate is aligned in a downwardly rubbing direction to the step portion.

In this exemplary embodiment, the line may form a storage capacitor.

An electro-optical device of a sixth exemplary embodiment of the present invention includes a first substrate having a plurality of pixel electrodes; a second substrate opposed to the first substrate; an electro-optical material interposed between the first substrate and the second substrate; a projection formed on the surface of the alignment layer of first substrate in an area corresponding to the spacing between adjacent pixel electrodes that are driven in mutually different polarities, the projection including a downwardly rubbed portion in the direction of the rubbing process of the first substrate; and a light-shielding layer formed in an area facing the downwardly rubbed portion, on at least one of the first substrate and the second substrate.

A substrate having a plurality of pixel electrodes of another exemplary embodiment of the present invention includes an alignment layer that is subjected to a rubbing process, and a step portion formed on the surface of the alignment layer in an area corresponding to a spacing between the pixel electrodes, and upwardly rubbed in the direction of the rubbing process.

The step portion may be formed at a groove in which a line is arranged, or at a projection for weakening a transverse electric field taking place between pixel electrodes.

The downwardly rubbed portion of the projection is preferably light-shielded by the light-shielding layer.

A method for manufacturing an electro-optical device of another exemplary embodiment of the present invention, wherein the device includes mutually opposed first substrate and second substrate with an electro-optical material interposed therebetween, a plurality of pixel electrodes and an alignment layer formed on the first substrate, and a counter electrode opposed to the pixel electrodes and formed on the second substrate, includes forming a substrate surface in one direction in which pixel electrodes are adjacent to each other so that the alignment layer between the pixel electrodes and the alignment layer over the pixel electrodes are planarized; forming, in the other direction in which pixel electrodes are adjacent to each other, a first step portion projecting from the substrate surface beneath the spacing between the adjacent pixel electrodes; forming the pixel electrode so that the edge of the pixel electrode comes to the first step portion; performing a rubbing process to the alignment layer; and forming a light-shielding layer on at least one of the first substrate and the second substrate so that the light-shielding layer overlaps one of the inclined surfaces of the first step portion in a plan view, along which the direction of the rubbing process of the alignment layer is downward.

A method for manufacturing an electro-optical device of another exemplary embodiment of the present invention wherein the device includes mutually opposed first and second substrates with an electro-optical material interposed therebetween, a plurality of pixel electrodes and an alignment layer formed on the first substrate, and a counter electrode opposed to the pixel electrodes and formed on the second substrate, the plurality of the pixel electrodes composed of a first group of pixel electrodes which are alternately driven in a first period, and a second group of pixel electrodes which are alternately driven in a second period complementary to the first period, includes forming a substrate surface in one direction in which pixel electrodes of the same pixel electrode group are adjacent to each other so that the alignment layer between the pixel electrodes of the same pixel electrode group and the alignment layer over the pixel electrodes are planarized; forming a first step portion projecting from the substrate surface beneath the spacing between a pixel electrode of the first pixel electrode group and a pixel electrode of the second pixel electrode group adjacent to the first group pixel electrode; forming the pixel electrode so that the edge of the pixel electrode comes to the first step portion; performing a rubbing process to the alignment layer; and forming a light-shielding layer on at least one of the first substrate and the second substrate so that the light-shielding layer overlaps one of the inclined surfaces of the first step portion in a plan view, along which the direction of the rubbing process of the alignment layer is downward.

The electro-optical device is thus manufactured through the above exemplary manufacturing methods.

The operation and other advantages of the present invention will be apparent from the following discussion of the exemplary embodiments.

BRIEF DESCRIPTION OF THE DRAWINGS

FIG. 1 is an equivalent circuit diagram of a variety of elements and lines in a plurality of pixels arranged in a matrix, constituting an image display area of the electro-optical device of a first exemplary embodiment.

FIG. 2 is a plan view showing a plurality of pixel groups composed of a plurality of adjacent pixels in a TFT array substrate having a data line, a scanning line, a pixel electrode, etc. in the electro-optical device of the first and second exemplary embodiments.

FIG. 3 is a cross-sectional view of the electro-optical device of the first embodiment taken along line III–III' in FIG. 2.

FIG. 4 is a cross-sectional view of the electro-optical device of the first embodiment taken along IV–IV' in FIG. 2.

FIG. 5 is a cross-sectional view of the electro-optical device of the first embodiment taken along V–V' in FIG. 2.

FIGS. 8(a) through 8(d) are process diagrams showing the manufacturing process of the electro-optical device of the first exemplary embodiment.

FIG. 9 is a cross-sectional view of the electro-optical device of a second exemplary embodiment taken along line III–III' in FIG. 2.

FIG. 10 is a cross-sectional view of the electro-optical device of the second exemplary embodiment taken along line IV–IV' in FIG. 2.

FIG. 11 is a cross-sectional view of the electro-optical device of the second exemplary embodiment taken along line V–V' in FIG. 2.

FIG. 13 is a plan view of the TFT array substrate with components arranged thereon, viewed from the counter substrate in the electro-optical device of each exemplary embodiment.

FIG. 14 is a cross-sectional view of the electro-optical device taken along line XIV–XIV' in FIG. 13.

FIG. 15 shows an exemplary embodiment of electronic equipment.

FIG. 16 shows an exemplary embodiment of a projection type display apparatus in which each of the exemplary embodiments is implemented.

FIG. 17 shows an exemplary embodiment of a personal computer in which each of the exemplary embodiments is implemented.

DETAILED DESCRIPTION OF PREFERRED EMBODIMENTS

Figure 6A:
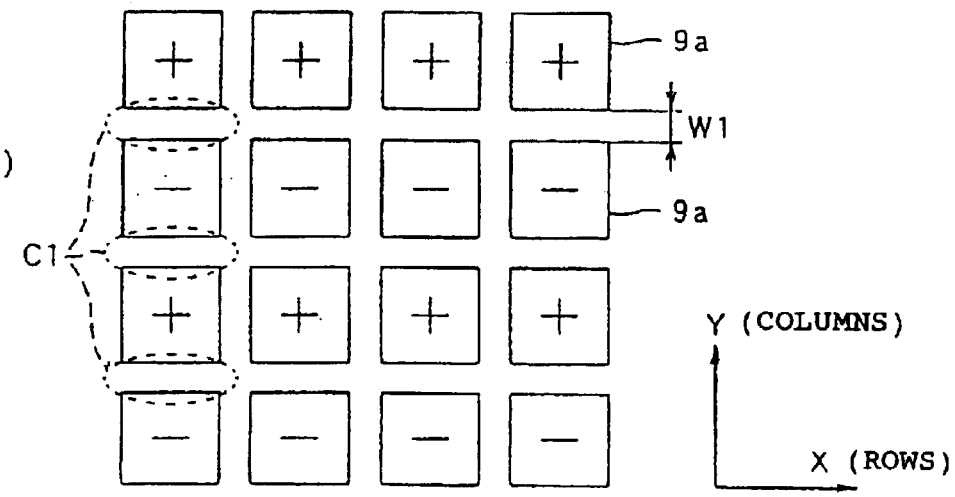
FIGS. 6(a) and 6(b) are diagrammatic plan views showing a pixel electrode in each pixel, and an area where a transverse electric field takes place in a 1H alternating drive method used in the first exemplary embodiment.

The exemplary embodiments of the present invention are now discussed, referring to the drawings. In each of the following exemplary embodiments, the electro-optical device of the present invention is incorporated in a liquid-crystal display device.

(First Exemplary Embodiment)

An electro-optical device of a first exemplary embodiment of the present invention is now discussed, referring to FIG. 1 through FIG. 7. FIG. 1 is an equivalent circuit diagram of a variety of elements and lines in a plurality of pixels arranged in a matrix, constituting an image display area of the electro-optical device. FIG. 2 is a plan view showing a plurality of pixel groups composed of a plurality of adjacent pixels in a TFT array substrate bearing a data line, a scanning line, a pixel electrode, etc. FIG. 3 is a cross-sectional view of the electro-optical device of the first exemplary embodiment, taken along line III–III' in FIG. 2. FIG. 4 is a cross-sectional view of the electro-optical device of the first exemplary embodiment, taken along line IV–IV' in FIG. 2. FIG. 5 is a cross-sectional view of the electro-optical device of the first exemplary embodiment, taken along line V–V' in FIG. 2. FIGS. 6(a) and 6(b) are diagrammatic plan views showing a pixel electrode in each pixel, and an area where a transverse electric field takes place in a 1H alternating drive method. FIGS. 7(a) through 7(c) are diagrammatic cross-sectional views showing the orientation of liquid-crystal molecules of a TN liquid crystal. In FIG. 3 through FIG. 5, layers and members are drawn in different scales to present them distinctly visible in the figures.

Referring to FIG. 1, the plurality of the pixels arranged in a matrix constituting the image display area of the electro-optical device of the first exemplary embodiment of the present invention include pixel electrodes 9a and TFTs 30 for controlling the respective pixel electrodes 9a, arranged in a matrix, and data lines 6a carrying a video signal are respectively electrically connected to the source regions of the TFTs 30. Video signals S1, S2, . . . , Sn may be supplied on the data lines 6a in a one-line-at-a-time manner in that order, or may be supplied to a group of adjacent data lines 6a at a time on a group-by-group basis. Scanning lines 3a are respectively electrically connected to the gates of the TFTs 30, and are supplied with scanning signal G1, G2, . . . , Gm in the form of pulse at a predetermined timing in a one-line-at-a-time manner in that order.

Pixel electrodes 9a are respectively electrically connected to the drain regions of the TFTs 30, and the video signals S1, S2, . . . , Sn fed through the data lines 6a are written at a predetermined timing by closing the TFTs 30, as a switching element, for a predetermined duration of time. The video signals S1, S2, . . . , Sn at a predetermined level, which are written on a liquid crystal as an electro-optical material through the pixel electrodes 9a, are stored in the liquid crystal for a predetermined duration of time with a counter electrode (to be discussed later) formed on a counter substrate (to be discussed later).

The liquid crystal modulates light to present it in a gray scale by varying the orientation or the order of the collection of molecules through voltage levels applied. In a normally white mode, the amount of light transmitted through the liquid crystal is reduced depending on a voltage applied, while in a normally black mode, the amount of light transmitted through the liquid crystal is increased depending on a voltage applied, and as a result, the electro-optical device outputs light bearing a contrast responsive to the video signal. To prevent the stored video signal from leaking, a storage capacitor 70 is added in parallel with the capacitor of the liquid crystal formed between the pixel electrode 9a and the counter electrode.

Figure 6B:
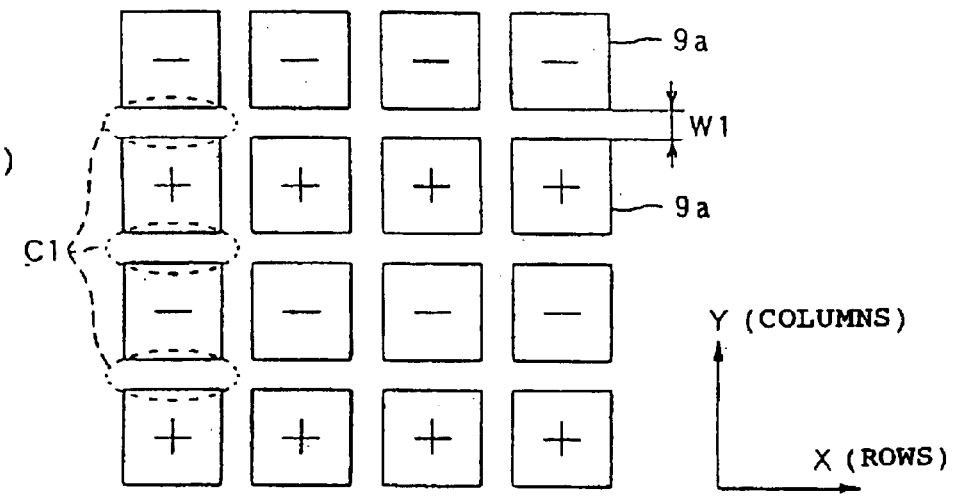

In the first exemplary embodiment, the 1H alternating drive method, from among the above-referenced conventional alternating drive methods, is performed (see FIGS. 6(a) and 6(b)). In this way, the electro-optical device prevents the degradation of the liquid crystal resulting from the application of a direct current while presenting an image with a reduced flickering, and in particular a reduced vertical cross talk, taking place with the period of frame or field.

Referring to FIG. 2, a matrix of transparent pixel electrodes 9a (the peripheral outline of which is represented by broken lines 9a' is arranged on a TFT array substrate of the electro-optical device, and the data line 6a, the scanning line 3a, and the capacitance line 3b extend along the vertical and horizontal borders between the pixel electrodes 9a. The data line 6a is electrically connected to the source region, to be discussed later, of a semiconductor layer 1a, fabricated of a polysilicon layer, through a contact hole 5. The pixel electrode 9a is electrically connected to the drain region, to be discussed later, of the semiconductor layer 1a through a contact hole 8. The scanning line 3a is arranged to face a channel region 1a', represented by an area hatched with lines inclined rightwardly downward as shown in FIG. 2, of the semiconductor layer 1a, and functions as a gate electrode. In this way, a pixel switching TFT 30, with the scanning line 3a facing the channel region 1a' as the gate electrode thereof, is arranged at each intersection of the scanning line 3a and the data line 6a.

The capacitance line 3b includes a main line portion that substantially linearly extends along the scanning line 3a, and a projecting portion that projects upward along the data line 6a from an intersection thereof with the data line 6a as shown in FIG. 2.

Particularly, in the first exemplary embodiment, a groove 201 is formed on the TFT array substrate, in an area facing an area of the data line 6a and the capacitance line 3b bordering the light transmissive area (the outline of the area is represented by solid lines shown in FIG. 2). As will be discussed later, a planarizing process is performed in an area where the data line 6a is formed. A bank-like projection, as one example of a first step portion, is formed in an area where the scanning line 3a and the data line 6a do not intersect, and a hollow portion, as a second step portion, is formed in an area where the capacitance line 3b borders the aperture area.

In the first exemplary embodiment, a rubbing process is performed on the alignment layer, to be discussed later, on the TFT array substrate on its side in contact with the liquid crystal in the direction indicated by an arrow R1. On the other hand, a rubbing process is performed on the alignment layer on the counter substrate on its side in contact with the liquid crystal in a direction perpendicular to the arrow R1. More specifically, if the rubbing process is performed on the alignment layer of the counter substrate leftwardly as shown, in a direction perpendicular to the arrow R1, with a TN liquid crystal arranged between these alignment layers, a liquid-crystal display device has the TN liquid crystal counterclockwise twisted by 90° between the alignment layers if viewed from the counter substrate, while having a visualization direction inclined in a rightwardly upward slant by 45°. If the rubbing process is performed on the alignment layer of the counter substrate rightwardly as shown, in a direction perpendicular to the arrow R1, with a TN liquid crystal arranged between these alignment layers, a liquid-crystal display device has the TN liquid crystal clockwise twisted by 90° if viewed from the counter substrate between the alignment layers, while having a visualization direction inclined in a leftwardly upward slant by 45°. It will also acceptable that the rubbing process may be performed on the alignment layer on the TFT array substrate on its side in contact with the liquid crystal in the direction of an arrow R2 or an arrow R3, and that the rubbing process may be performed on the alignment layer on the counter substrate on its side in contact the liquid crystal in a direction perpendicular to the arrow R2 or the arrow R3. With this arrangement, the visualization direction of the TN liquid crystal may be set to be in the direction of the arrow R1 or in the direction opposite to the direction of the arrow R1. In a multi-panel projector having three TN liquid-crystal display devices, the visualization directions of the TN liquid crystals are aligned, controlling color irregularities on display. Since the planarization is achieved by burying at least a part of the data line 6a and the capacitance line 3b in this embodiment, the orientation defect due to the step portion is minimized.

Referring to a cross-sectional view in FIG. 3, the electro-optical device includes the transparent TFT array substrate 10 and a transparent counter substrate 20 opposed to the transparent TFT array substrate 10. The TFT array substrate 10 is fabricated of a quartz substrate, a glass substrate, or a silicon substrate, for instance, and the counter substrate 20 is fabricated of a glass substrate or a quartz substrate, for instance. The TFT array substrate 10 is provided with the pixel electrodes 9a, and arranged on top of them is an alignment layer 16 which has been subjected to a rubbing process. The pixel electrode 9a is fabricated of a transparent, electrically conductive film, such as an ITO (Indium Tin Oxide) film. The alignment layer 16 is fabricated of an organic film, such as a polyimide film.

The counter substrate 20 has a counter electrode 21 extending on the entire surface thereof, and an alignment layer 22 therebeneath that has been subjected to a rubbing process. The counter electrode 21 is fabricated of a transparent, electrically conductive film, such as an ITO film. The alignment layer 22 is fabricated of an organic film such as a polyimide film.

Arranged on the TFT array substrate 10 is a pixel switching TFT 30, adjacent to each pixel electrode 9a, for controlling the pixel electrode 9a.

Arranged on the counter substrate 20 is a light-shielding layer 23, in a non-aperture area in each pixel as shown in FIG. 3. For this reason, no incident light enters a channel region 1a', a lightly doped source region 1b, and a lightly doped drain region 1c of a semiconductor layer 1a of the pixel switching TFT 30, from the counter substrate 20. The light-shielding layer 23 has the function of improving a contrast ratio, and the function of preventing color mixing of color materials when a color filter is produced. In the first exemplary embodiment, the data line 6a having light-shielding property and constructed of Al or the like may be used to light-shield the non-aperture area of each pixel to define a segment of the outline of the aperture area of each pixel along the data line 6a, or the light-shielding layer 23 arranged on the counter substrate 20 may redundantly or solely light-shield the non-aperture area along the data line 6a.

A liquid crystal, as one example of the electro-optical material, is encapsulated, in a gap surrounded by a sealing material to be discussed later, between the TFT array substrate 10 and the counter substrate 20 arranged with the pixel electrodes 9a facing the counter electrode 21, and a liquid-crystal layer 50 is thus formed. The liquid-crystal layer 50 takes a predetermined orientation state determined by the alignment layer 16 and the alignment layer 22 with no electric field applied by the pixel electrode 9a. The liquid-crystal layer 50 is formed of a mixture of one or several types of nematic liquid crystals. The sealing material is an adhesive agent made of a thermal setting agent or a photo-setting agent for bonding the TFT array substrate 10 to the counter substrate 20 along the edges thereof, and is mixed with spacers such as glass fiber or glass beads to keep a predetermined distance between the two substrates.

An undercoating insulating layer 12 is arranged between the TFT array substrate 10 and the plurality of the pixel switching TFTs 30. The undercoating insulating layer 12 extends on the entire surface of the TFT array substrate 10, preventing irregularities during the polishing of the surface of the TFT array substrate 10 and dirt left after a cleaning operation, from changing the characteristics of the pixel switching TFT 30. The undercoating insulating layer 12 is fabricated of highly insulating glass such as NSG (non-doped silicate glass), PSG (phosphosilicate glass), BSG (borosilicate glass), BPSG (borophosphosilicate glass) or a silicon oxide film or a silicon nitride film.

In the first exemplary embodiment, the semiconductor layer 1a extends from a heavily doped drain region 1e, forming a first storage capacitor electrode 1f, and a portion of the capacitance line 3b facing the capacitor electrode 1f becomes a second capacitor electrode, and a thin insulating layer 2 including a gate insulator extends from a position thereof facing the scanning line 3a, thereby serving as a dielectric layer interposed between these electrodes, and thereby forming the storage capacitor 70.

Referring to FIG. 3, the pixel switching TFT 30 has an LDD (Lightly Doped Drain) structure, and includes the scanning line 3a, the channel region 1a' of the semiconductor layer 1a in which a channel is formed by the electric field from the scanning line 3a, the thin insulating layer 2 including the gate insulator for insulating the scanning line 3a from the semiconductor layer 1a, the data line 6a, the lightly doped source region 1b and the lightly doped drain region 1c of the semiconductor layer 1a, and a heavily doped source region 1d and the heavily doped drain region 1e of the semiconductor layer 1a. A corresponding one of the plurality of the pixel electrodes 9a is connected to the heavily doped drain region 1e through the contact hole 8. Formed on top of the scanning line 3a and the capacitance line 3b is a first interlayer insulator 4 having a contact hole 5 connecting to the heavily doped source region 1d and a contact hole 8 connecting to the heavily doped drain region 1e. Formed on top of the data line 6a and the first interlayer insulator 4 is a second interlayer insulator 7 having the contact hole 8 connecting to the heavily doped drain region 1e. The above-referenced pixel electrode 9a is formed on top of the second interlayer insulator 7 thus constructed.

Referring to FIG. 4, the data line 6a is arranged in the non-aperture area of the pixel, in the spacing between the horizontally adjacent pixel electrodes 9a as shown in FIG. 2, and the data line 6a defines the segment of the outline of the aperture area of each pixel along the data line 6a, and the visible defect is prevented by the data line 6a in the non-aperture area. The storage capacitor 70 is formed beneath the data line 6a, making use of the projecting portion of the main line portion of the capacitance line 3b extending beneath the data line 6a, and the non-aperture area is thus effectively utilized.

Referring to FIG. 5, the scanning line 3a and the capacitance line 3b are arranged in the non-aperture area of each pixel positioned in the spacing between vertically adjacent pixel electrodes 9a as shown in FIG. 2, and the light-shielding layer 23 on the counter substrate 20 defines a segment of the outline of the aperture area of each pixel along the scanning line 3a, and prevents visible defect in the non-aperture area.

As shown in FIG. 3 and FIG. 4, the first exemplary embodiment in particular includes the grooves 201 in an area facing an area extending along the data line 6a, the capacitance line 3b, and the TFT 30 in the TFT array substrate 10, and these members are buried in the groove 201. It is acceptable that the scanning line 3a, which intersects the data line 6a, may be partly buried in the groove 201.

Referring to FIG. 4, the depth of the groove 201 is so determined that the top surface of the second interlayer insulator 7 serving as a substrate surface beneath the pixel electrode 9a above the data line 6a is level with the top surface of the second interlayer insulator 7 in a central portion of the pixel electrode 9a, which occupies a majority of the aperture area of each pixel. In this way, the planarizing process is performed on the data line 6a.

Referring to FIG. 5, a projection 301 is formed as an example of a first step portion serving as a substrate surface beneath the pixel electrode 9a above the scanning line 3a, and a hollow portion 302 is formed as a second step portion serving as a substrate surface beneath the pixel electrode 9a above the capacitance line 3b. The hollow portion 302, rather than a projection, is formed on the capacitance line 3b, because the thickness between the TFT array substrate 10 and the substrate surface in the area where the capacitance line 3b is formed is smaller than the thickness between the TFT array substrate 10 and the substrate surface in the area where the data line 6a is formed. As shown in FIG. 5, the rubbing process is performed on the alignment layer 16 of the TFT array substrate 10 in the direction of the arrow RI. On the other hand, the alignment process is performed on the alignment layer 22 of the counter substrate 20 in the direction perpendicular to the direction of the arrow R1 as already discussed. An upwardly rubbed portion 401 that is upwardly rubbed is formed on an inclined surface of the projection 301 because the surface of the alignment layer 16 rises in the rubbing direction, an upwardly rubbed portion 402 that is rubbed upwardly is formed on an inclined surface of the hollow portion 302 because the surface of the alignment layer 16 rises in the rubbing direction, and a downwardly rubbed portion 403 that is downwardly rubbed is formed on an inclined surface extending from the projection 301 to the hollow portion 302 because the surface of the alignment layer 16 falls in the rubbing direction. If the hollow portion 302 shown in FIG. 5 is level with the pixel electrode 9a in the aperture area, the effectiveness of the hollow portion 302 is maximized.

The study conducted by the inventors of this invention reveals that the upwardly rubbed portions 401 and 402 present a relatively good orientation of the liquid crystal regardless of the step. In contrast, the study shows that the step in the downwardly rubbed portion 403 presents a noticeable orientation defect in the liquid crystal. If the pretilt angle of the liquid crystal is approximately equal to the angle of the step, the step causes no visible defect, and if the pretilt angle is opposite to the angle of the step, a visible defect is caused by reverse tilt. In the first exemplary embodiment, the light-shielding layer 23 formed on the counter substrate 20 light-shields the downwardly rubbed portion 403. The plan layout of the light-shielding layer 23 is determined so that the light-shielding layer 23 keeps the upwardly rubbed portions 401 and 402 unshielded as much as possible. Since the pixel electrode 9a formed on the upwardly rubbed portions 401 and 402 results in almost no visible defect, the aperture area through which light is transmitted is set to be larger than in the conventional art. By leaving the upwardly rubbed portions 401 and 402 unshielded as much as possible, the pixel aperture ratio is increased without lowering the contrast ratio. Although the downwardly rubbed portion 403 causes an orientation defect in the liquid crystal, the corresponding area is light-shielded and falls within the non-aperture area of each pixel, and no visible defect occurs. By light-shielding the downwardly rubbed portion 403 with the light-shielding layer 23, a drop in the contrast ratio due to the orientation defect is avoided. To cover the orientation defect of the liquid crystal due to the downwardly rubbed portion 403, the light-shielding layer 23 is preferably set to be slightly wider in width thereacross than the downwardly rubbed portion 403. The light-shielding layer 23 may be arranged on the TFT array substrate 10, rather than on the counter substrate 20.

In the periphery of the pixel electrode 9a along the data line 6a, the data line 6a is buried in the groove 201 to planarize the pixel electrode 9a, and no orientation defect of the liquid crystal due to the step portion occurs there. Since no orientation defect of the liquid crystal attributed to the step portion occurs in the data line 6a on which the planarizing process has been performed, an accordingly narrow light-shielding layer works, or the light-shielding layer may be dispensed with. The data line 6a fabricated of Al (aluminum), having a light-shielding feature in the first exemplary embodiment as already discussed, advantageously increases the pixel aperture ratio.

In the electro-optical device of the first embodiment, the planarizing process is performed in the periphery of the pixel electrode 9a along the data line 6a, and the image due to the step is minimized by covering the downwardly rubbed portion 403 with the light-shielding layer 23 in the periphery of the pixel electrode 9a along the scanning line 3a. The area of the pixel electrode in the upwardly rubbed portions 401 and 402 is positively utilized, and the pixel aperture ratio is thus increased without lowering the contrast ratio.

The relationship between the voltage polarity of adjacent pixel electrodes 9a and the generation area of the transverse electric field in the 1H alternating drive method adopted in the first exemplary embodiment is now discussed, referring to FIGS. 6(a) and 6(b).

Referring to FIG. 6(a), during the presentation of an n-th (n is a natural number) field video signal or frame video signal, the polarity of the liquid-crystal driving potential represented by +or −in each pixel electrode 9a is not inverted, and the pixel electrodes 9a are driven by the same polarity on a row-by-row basis. Referring to FIG. 6(b), during the presentation of an (n+1)-th field video signal or one frame video signal, the polarity of the liquid-crystal driving potential in the pixel electrodes 9a is inverted, and during the presentation of the (n+1)-th field or the one frame video signal, the polarity of the liquid-crystal driving represented by +or −in each pixel electrode 9a is not inverted, and the pixel electrodes 9a are driven by the same polarity on a row-by-row basis. The states shown in FIG. 6(a) and FIG. 6(b) are repeated in the period of one field or one frame, and the device is thus driven in the 1H alternating drive method. As a result, the device is free from the degradation of the liquid-crystal through the application of the direct current while presenting an image with reduced cross talk and reduced flickering. The 1H alternating drive method outperforms the 1S alternating drive method in that almost no vertical cross talk is presented.

Referring to FIG. 6(a) and FIG. 6(b), in the 1H alternating drive method, the generation area C1 of the transverse electric field is always located in the spacing between adjacent pixel-electrodes 9a in a vertical direction (a Y direction).

Referring to FIG. 5, the first exemplary embodiment includes the projection 301 to intensify the longitudinal electric field in the periphery of the pixel electrode 9a. Specifically, referring to FIG. 5, the distance d1 between the edge portion of the pixel electrode 9a located on top of the projection 301 and the counter electrode 21 is shortened by the step portion of the projection 301. In contrast, as shown in FIG. 4, the planarizing process is performed on the data line 6a. The distance d2 between the edge portion of the pixel electrode 9a and the counter electrode 21 becomes approximately equal to the distance D between the central area of the pixel electrode 9a, which is a majority area of the pixel electrode 9a, and the counter electrode 21.

In the generation area C1 of the transverse electric field shown in FIGS. 6(a) and 6(b), the longitudinal electric field between the pixel electrode 9a and the counter electrode 21 can thus be intensified. Even if the distance d1 is decreased as shown in FIG. 5, the spacing W1 between the adjacent pixel electrodes 9a remains unchanged, and the transverse electric field, which could intensify with a narrowing spacing W1, is also kept constant. For this reason, the longitudinal electric field is set to be stronger than the transverse electric field in localized areas in the generation area C1 of the transverse electric field shown in FIGS. 6(a) and 6(b), and as a result, the longitudinal electric field becomes predominant, thereby controlling the disclination of the liquid crystal in the generation area C1 of the transverse electric field.

Referring to FIG. 4, the planarizing process is performed on the data line 6a, controlling the creation of the orientation defect of the liquid crystal attributed to the step caused by the data line 6a or the like in that area. Because of the planarizing process implemented, the distance d2 between the pixel electrode 9a and the counter electrode 21 is not decreased and the longitudinal electric field is not intensified. No transverse electric field is created in this area, unlike in the spacing between the pixel electrodes 9a as shown in FIGS. 6(a) and 6(b). Without any step implemented for the transverse electric field in this area, the planarizing process keeps the orientation state of the liquid crystal extremely good.

In accordance with the first exemplary embodiment, as a result, focusing on the characteristics of the transverse electric field generated in the 1H alternating drive method, the longitudinal electric field is intensified by arranging the edge of the pixel electrode 9a on the projection 301 in the generation area C1 of the transverse electric field, thereby reducing the adverse effect of the transverse electric field with the longitudinal electric field intensified, while the planarizing process is performed in the area where no transverse electric field is generated, in order to reduce the adverse effect of the step in the pixel electrode 9a. In this way, the disclination of the liquid crystal resulting from the transverse electric field and the orientation defect of the liquid crystal by the step are generally reduced, and the light-shielding layer 23 for covering the orientation defect portions of the liquid crystal is reduced in size. The aperture ratio of each pixel is increased without creating image defects such as visible defect.

According to the study carried out by the inventors of this invention, the liquid-crystal layer 50 needs to have a thickness (as thick as 3 mm or so, for instance) to keep the light resistance thereof at a certain level, not to make difficult an injection process of the liquid-crystal, and to allow liquid-crystal molecules to move well in response to an electric field applied in operation. On the other hand, the study also shows that if the spacing W1 (see FIG. 5) between the adjacent pixel electrodes 9a is set to be shorter than the distance d1 between the pixel electrode 9a in the corresponding area and the counter electrode 21 (specifically, W1<d1), the adverse effect of the transverse electric field becomes pronounced. If the thickness D (see FIG. 4 and FIG. 5) of the entire liquid-crystal layer 50 is merely thinned to achieve a high aperture ratio of fine-pitched pixels, the control of the thickness of the liquid crystal will become difficult, the light resistance will drop, the injection process will become difficult, and the liquid crystal molecules will be thus subject to faulty operations. Conversely, if the spacing W1 between the adjacent pixel electrodes 9a is merely decreased without thinning the liquid-crystal layer 50 to achieve a high aperture ratio of the fine-pitched pixels, the transverse electric field will intensify relative to the longitudinal electric field, and the disclination of the liquid crystal due to the transverse electric field will become pronounced. Considering these properties of the liquid-crystal display apparatus, as in the first exemplary embodiment discussed above, the thickness d1 of the liquid-crystal layer 50 is decreased (to 1.5 mm or so, for instance) in only the area where the transverse electric field is generated while the thickness D of the liquid-crystal layer 50 in the remaining area, which occupies the majority of the pixel electrode 9a, is not decreased, and the thickness D in the light transmissive area of the liquid-crystal layer 50 is assured to be enough (to 3 mm or so, for instance), and the spacing W1 between the adjacent pixel electrodes 9a is narrowed while not relatively intensifying the transverse electric field. This arrangement works effectively, achieving a high aperture ratio in the fine-pitched pixels and presenting a high-definition image.

Referring to FIG. 5, in the first exemplary embodiment in particular, the pixel electrodes 9a are preferably two-dimensionally arranged to hold the relationship of 0.5D<W1. Furthermore, the projection 301 is formed to satisfy the relationship of d1+300 nm (nanometer)≦D. Specifically, if the projection 301 is protruded for a step of 300 nm or larger with the pixel electrodes 9a kept to be not too close to each other, the longitudinal electric field in this area is intensified relative to the transverse electric field to the degree that the adverse effect of the transverse electric field is not pronounced. Although decreasing the spacing W1 (and the spacing W2 of FIG. 4) to be as small as possible is effective to achieve a high aperture ratio in the fine-pitched pixels and to present a high definition image, the spacing W1 cannot be limitlessly decreased in an effort to keep the adverse effect of the transverse electric field contained. If the spacing W1 is decreased to be nearly equal to d1, a high aperture ratio of the fine-pitched pixels is most effectively achieved without degrading the quality of the image.

Furthermore in the first exemplary embodiment, the edge of the pixel electrode 9a is preferably positioned to be on the peak of the projection 301. With this arrangement, the distance d1 between the edge portion of the pixel electrode 9a and the counter electrode 21 is decreased by making maximum use of the height of the projection 301. At the same time, the longitudinal electric field is intensified relative to the transverse electric field in the generation area C1 of the transverse electric field by efficiently making use of the configuration of the projection 301.

In the first exemplary embodiment, in particular, the projection 301 and the hollow portion 302 are configured so that the edge portions of the two pixel electrodes, driven in opposite polarities during the 1H alternating driving, are different in level. The distance between the two edge portions is lengthened not only by a horizontal distance therebetween but also a vertical distance (the distance between the edge portions is $(x^2+y^2)^{1/2}$ when x represents the horizontal distance and y represents the vertical distance). With this arrangement, the horizontal distance between the pixel electrodes can be narrowed. The transverse electric field weakens as the distance between the adjacent pixel electrodes is lengthened. The transverse electric field is weakened to almost zero level with an increase in the vertical distance. The generation of the disclination of the liquid crystal due to the transverse electric field is efficiently controlled. The edge portion of the pixel electrode 9a may be placed at the highest portion of the projection 301 in the generation area C1 of the transverse electric field. In this case, the distance d1 between the edge portion of the pixel electrode 9a and the counter electrode 21 is narrowed. Even if a transverse electric field takes place, the longitudinal electric field is intensified relative to the transverse electric field, and the disclination of the liquid crystal due to the transverse electric field is thus efficiently reduced.

Figure 7A:
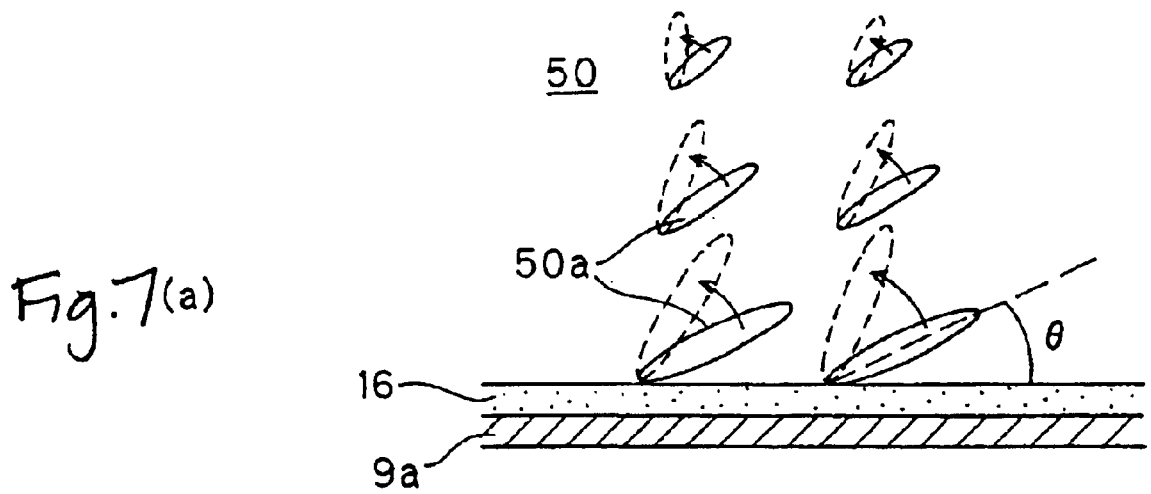
FIGS. 7(a) through 7(c) are diagrammatic cross-sectional views showing the orientation of liquid-crystal molecules when a TN liquid crystal is used in the first exemplary embodiment.
Figure 7B:
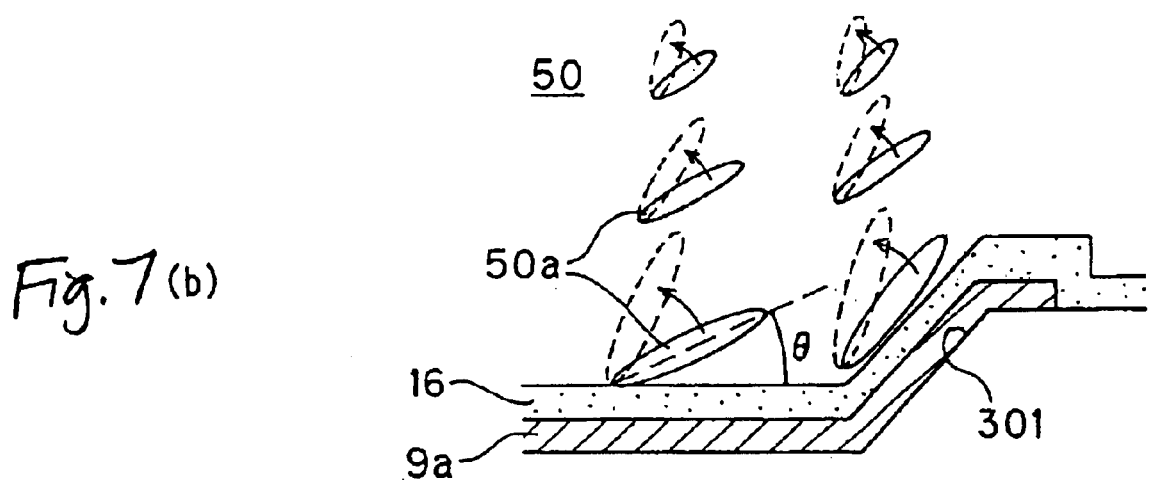

Referring to FIG. 7(b), the liquid-crystal layer 50 is preferably fabricated of a TN (Twisted Nematic) liquid crystal in the first embodiment, and the projection 301 has a tapered sidewall. The pretilt angle q of the TN liquid crystal in the TFT array substrate 10 is set to match the inclination angle of the tapered sidewall.

Figure 7C:
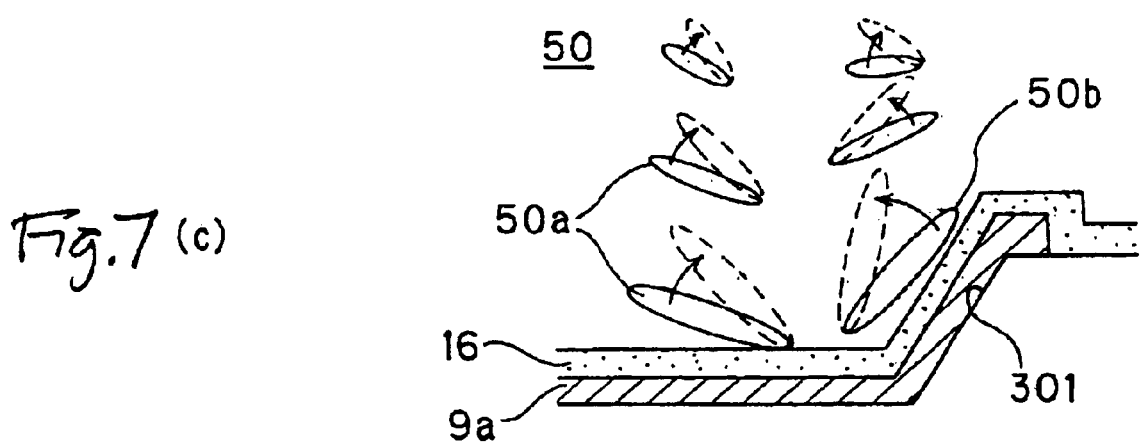

Specifically, as shown in FIG. 7(a), the liquid-crystal molecules 50a of the TN liquid crystal are aligned to be substantially in parallel with the substrate with no voltage applied, while gradually being twisted toward the counter substrate 20 from the TFT array substrate 10. With a voltage applied, the liquid-crystal molecules 50a are aligned to be vertical to the substrate surface as represented by arrows. Referring to FIG. 7(b), the sidewall of the projection 301 is tapered, and the inclination angle of the tapered sidewall is set to match the pretilt angle θ of the TN liquid crystal. Even if the thickness d1 of the liquid crystal gradually laterally decreases between the projection 301 and the counter substrate 20, a good liquid-crystal orientation state as good as when the layer thickness D of the liquid crystal remains constant is obtained. In other words, this arrangement minimizes the liquid crystal orientation defect attributed to the step caused by the presence of the projection 301. If the pretilt angle θ of the TN liquid crystal fails to match the inclination angle of the tapered sidewall as shown in FIG. 7(c), there occur liquid-crystal molecules 50b which rise in a direction opposite to the direction of the remaining liquid-crystal molecules 50a, between the projection 301 and the counter substrate 20, and the orientation state is discontinued, and the disclination of the liquid crystal occurs. (Manufacturing process of the first exemplary embodiment)

A manufacturing process of the TFT array substrate constituting the electro-optical device of the first exemplary embodiment having the above-discussed construction is now discussed, referring to FIGS. 8(a) through 8(d). FIGS. 8(a) through 8(d) are process diagrams showing the layers of the TFT array substrate, corresponding to the cross section IV–IV' in FIG. 2 and the cross section V–V' in FIG. 2, as shown in FIG. 4 and FIG. 5.

Referring to FIG. 8(a), the TFT array substrate 10, such as a quartz substrate, a hard glass substrate, or a silicon substrate is prepared, and the groove 201 is formed through an etching process where the data line 6a is to be laid out.

Referring to FIG. 8(b), the scanning line 3a, the capacitance line 3b, and the data line 6a are formed on the TFT array substrate 10 having the groove 201 formed thereon, using a thin-film forming technique. In parallel with this step portion, the TFT 30 and the storage capacitor 70 shown in FIG. 3 are formed.

Specifically, formed on the TFT array substrate 10 having the groove 201 thereon is an undercoating insulating layer 12 which has a thickness within a range from 500 to 2000 nm, and is fabricated of a silicate glass film such as NSG, PSG, BSG, or BPSG, a silicon nitride film, or a silicon oxide film, using TEOS (tetraethylorthosilicate) gas, TEB (triethyl borate) gas, or TMOP (trimethyl phosphate) gas or the like through an atmospheric CVD method or a reduced pressure CVD method. Next, an amorphous silicon layer is formed on top of the undercoating insulating layer 12 using a reduced pressure CVD method and is subjected to a heat treatment process, and a polysilicon layer is thus epitaxially grown in solid phase. Alternatively, rather than through the amorphous silicon layer, a polysilicon layer is directly formed through a reduced pressure CVD method. By subjecting the polysilicon layer to a photolithographic process, an etching process, etc., the semiconductor layer 1a having a predetermined pattern including the first storage capacitor electrode 1f shown in FIG. 2 is formed. Through a thermal oxidation, the thin insulating layer 2 including the dielectric layer for the storage capacitor is formed along with the gate insulator of the TFT 30 shown in FIG. 3. As a result, the thickness of the semiconductor layer 1 a falls within a range of about 30 to 150 nm, and preferably within a range of about 35 to 50 nm, and the thickness of the thin insulating layer 2 falls within a range of about 10 to 150 nm, and preferably within a range of 30 to 100 nm. A polysilicon layer having a thickness within a range of about 100 to 500 run is deposited through a reduced pressure CVD method, and the polysilicon layer is thermally diffused with or doped with P (phosphorus) to turn into a conductive layer, and then through a photolithographic process, an etching process, etc., the scanning line 3a and the capacitance line 3b having predetermined patterns shown in FIG. 2 are produced. The scanning line 3a and the capacitance line 3b may be fabricated of a metal alloy of a refractory metal or a metal silicide, or may be a multilayer wiring in combination with a polysilicon film. Next, doping impurity at two phases of a low dose and a high dose produces the pixel switching TFT 30 having the LDD structure including the lightly doped source region 1b and the lightly doped drain region 1c, and the heavily doped source region 1d and the heavily doped drain region 1e.

In parallel with of FIG. 8(b), peripheral circuits, such a data line drive circuit and a scanning line drive circuit, composed of TFTs, may be formed on the TFT array substrate 10.

Referring to of FIG. 8(c), the first interlayer insulator 4, fabricated of a silicate glass film such as NSG, PSG, BSG, or BPSG, a silicon nitride film, or a silicon oxide film, is produced using TEOS gas through an atmospheric CVD method or a reduced pressure CVD method to cover the laminate of the scanning line 3a, the capacitance line 3b, the thin insulating layer 2 and the undercoating insulating layer 12. The first interlayer insulator 4 has a thickness within a range of 1000 to 2000 nm. In parallel with or immediately subsequent to this calcination process, a heat treatment process may be performed at 1000° C. to activate the semiconductor layer 1a. The contact hole for electrically connecting the data line 6a shown in FIG. 3 to the heavily doped source region 1d of the semiconductor layer 1a is drilled in the first interlayer insulator 4 and the thin insulating layer 2, and contact holes for connecting the scanning line 3a and the capacitance line 3b to unshown lines in the area peripheral to the substrate are also drilled at the same step portion as that for the contact hole 5. In succession, a low-resistance metal film of Al or the like and a metal silicide film are deposited to a thickness within a range of about 100 to 500 nm on the first interlayer insulator 4 through a sputtering process, and the data line 6a is formed through a photolithographic process, an etching process, and the like.

Referring to of FIG. 8(d), the second interlayer insulator 7 is deposited on the data line 6a. Referring to FIG. 3, the contact hole 8 for electrically connecting the pixel electrode 9a to the heavily doped drain region 1e is formed through a dry etching process such as a reactive ion etching or a reactive ion beam etching, or a wet etching process. In succession, a transparent, electrically conductive layer such as an ITO layer is deposited to a thickness within a range of about 50 to 200 nm on the second interlayer insulator 7 using a sputtering step portion, and the pixel electrode 9a is formed through a photolithographic process, an etching process, and the like. When the electro-optical device is used as a reflective type, the pixel electrode 9a may be made of a highly opaque material such as Al.

In accordance with the manufacturing method of the first exemplary embodiment, the planarizing process is performed on the data line 6a by forming the groove 201 in the TFT array substrate 10 to lay the data line 6a there while the capacitance line 3b and the scanning line 3a are partly buried into the groove 201. The projection 301 and the hollow portion 302 having the upwardly rubbed portions 401 and 402 and the downwardly rubbed portion 403 are thus formed. The liquid-crystal display device of the first exemplary embodiment, free from the orientation defect of the liquid crystal due to the step portion and the generation of disclination of the liquid crystal due to the transverse electric field, is relatively easily manufactured.

(Second Exemplary Embodiment)

The construction of the electro-optical device of a second exemplary embodiment of the present invention is now discussed, referring to FIG. 2, and FIG. 9 through FIG. 11. FIG. 2, which is common to the first exemplary embodiment, is a plan view showing a plurality of pixel groups composed of a plurality of adjacent pixels in a TFT array substrate having a data line, a scanning line, a pixel electrode, etc. in the electro-optical device of the second exemplary embodiment FIG. 9 is a cross-sectional view of the electro-optical device of the second exemplary embodiment taken along line III–III' in FIG. 2. FIG. 10 is a cross-sectional view of the electro-optical device of the second exemplary embodiment taken along line IV–IV' in FIG. 2. FIG. 11 is a cross-sectional view of the electro-optical device of the second exemplary embodiment taken along line V–V' in FIG. 2. In FIG. 9 through FIG. 11, layers and members are drawn in different scales to present them distinctly visible in figures. In the second exemplary embodiment described with reference to FIG. 9 through FIG. 11, components identical to those in connection with the first exemplary embodiment shown in FIG. 3 through FIG. 5 are designated with the same reference numerals, and the discussion thereabout is not repeated here.

A circuit arrangement of the second exemplary embodiment remains unchanged from that of the first exemplary embodiment shown in FIG. 1.

In contrast to the first exemplary embodiment in which the groove 201 is formed in the TFT array substrate 10, a groove 201' is formed in an undercoating insulating layer 12' formed on the TFT array substrate 10' in the second exemplary embodiment as shown in FIG. 9 through FIG. 11. The configuration of the top surface of the undercoating insulating layer 12' remains unchanged from that of the top surface of the undercoating insulating layer 12 in the first exemplary embodiment. The remaining construction and operation of the second exemplary embodiment remain unchanged from those of the first embodiment.

The second exemplary embodiment provides the same advantages as those in the first exemplary embodiment.

The groove in which the data line 6a is buried is not limited to the grooves 201 and 201' in the first and second embodiments.

Figure 12A:
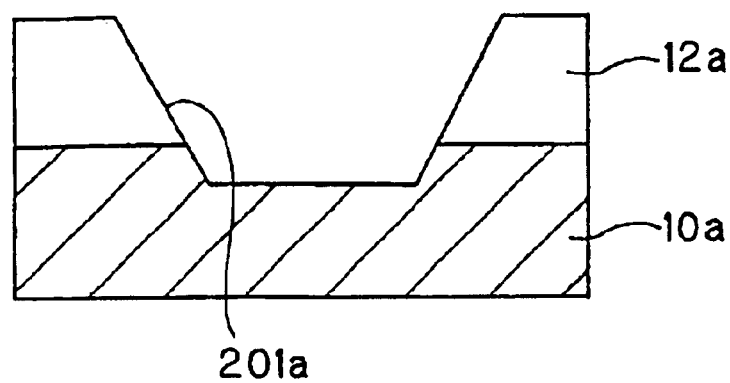
FIGS. 12(a) through 12(c) are cross-sectional views showing a variety of sections of projections in each of the exemplary embodiments of the present invention.
Figure 12B:
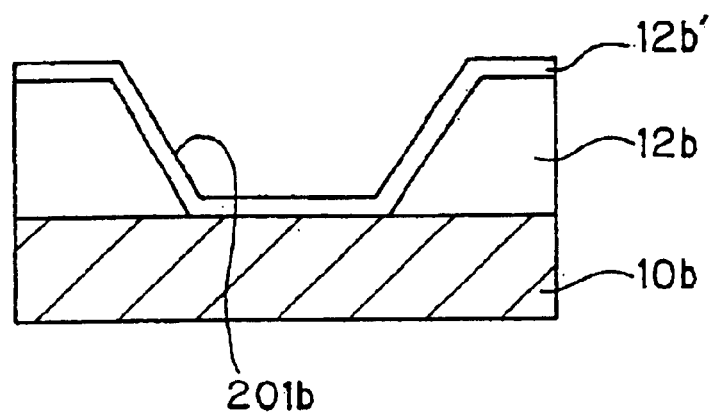
Figure 12C:
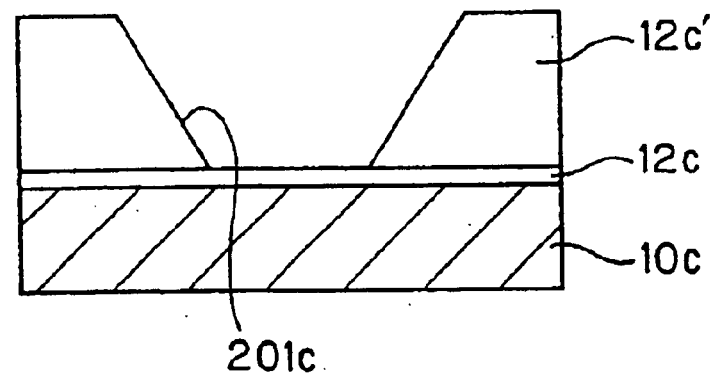

For instance, as shown in FIG. 12(a), an undercoating insulating layer 12a is formed on a TFT array substrate 10a, and an etching process is performed to etch through the undercoating insulating layer 12a into the TFT array substrate 10a. A groove 201a thus results. As shown in FIG. 12(b), an insulating layer 12b is formed on a TFT array substrate 10b, and is then subjected to an etching process. A thin insulating layer 12b' is further deposited to form a groove 201b on an undercoating insulating layer of two layers. In this case, the thickness of the undercoating insulating layer 12b controls the depth of the groove 201b, and the undercoating insulating layer 12' controls the bottom thickness of the groove 201b. Referring to FIG. 12(c), a thin insulating layer 12c, hard to etch, is formed on a TFT array substrate 10c, and an insulating layer 12c', easy to etch, is formed thereon. By etching the insulating layer 12c', a groove 201c made of two layers is formed. In this case, the thickness of the insulating layer 12c controls the bottom thickness of the groove 201c and the insulating film 12c' controls the depth of the groove 201c. Cases shown in FIG. 12(b) and FIG. 12(c) facilitate the formation of refractory metal which light-shields a pixel switching TFT between the undercoating insulating layer and the TFT array substrate from the TFT array substrate. By forming the undercoating insulating layer in the area of the groove in this way, the light-shielding layer and the pixel switching TFT are electrically isolated from each other.

In each of the above exemplary embodiments, the above-discussed 1S alternating drive method may be employed. In this case, the substrate surface beneath the pixel electrode 9a is planarized along the scanning line 3a, because the transverse electric field is generated between adjacent pixel electrodes 9a in the row direction (X direction). The projection 301 is formed to run along the data line 6a. Decreasing the distance between the pixel electrode 9a and the counter electrode 21 in the area where the transverse electric field is generated intensifies the longitudinal electric field, thereby reducing the adverse effect of the transverse electric field. In the present invention, the polarity of the driving voltage may be inverted every row, or every two adjacent rows, or every plural number of adjacent rows in the 1H alternating drive method. Similarly, the polarity of the driving voltage may be inverted every column, or every two adjacent columns, or every plural number of adjacent columns in the 1S alternating drive method.

(General Construction of the Electro-optical Device)

The general construction of the electro-optical device of the above exemplary embodiments is now discussed, referring to FIG. 13 and FIG. 14. FIG. 13 is a plan view of the TFT array substrate 10 with components arranged thereon, viewed from the counter substrate 20, and FIG. 14 is a cross-sectional view taken along line XIV–XIV' in FIG. 13.

Referring to FIG. 13, the TFT array substrate 10 is provided with a sealing material 52 along the internal edge thereof A frame 53, fabricated of the same material as that of the light-shielding layer 23 or of a different material, extends along the internal edge of the sealing material 52, which defines the peripheral outline of an image display area. A data line drive circuit 101 for driving the data line 6a by supplying the data line 6a with a video signal at a predetermined timing, and external circuit interconnect terminals 102 are arranged on one side of the TFT array substrate 10, external to the area of the sealing material 52. Scanning line drive circuits 104 for driving the scanning line 3a by supplying the scanning line 3a with a scanning signal at a predetermined timing is arranged on two sides of the first side of the TFT array substrate 10. If a delay in the scanning signal supplied to the scanning line 3a presents no problem, the scanning line drive circuit 104 may be mounted on one side only. Further, data line drive circuits 101 may be arranged on both sides of the image display area. For instance, odd data lines may be supplied with the video signal by the data line drive circuit arranged on one side of the image display area, and even data lines may be supplied with the video signal by the data line drive circuit arranged on the opposite side of the image display area. If the data lines 6a are driven in an interdigital fashion in this way, the area occupied by the data line drive circuits 101 is expanded, and a complex circuit may be incorporated therewithin. Arranged on the one remaining side of the image display area of the TFT array substrate 10 are a plurality of lines 105 for connecting the scanning line drive circuits 104 mounted on both sides of the image display area. A conductive material 106 for electrically connecting the TFT array substrate 10 to the counter substrate 20 is mounted at least one corner of the counter substrate 20. Referring to FIG. 14, the counter substrate 20 having almost the same outline as that of the sealing material 52 shown in FIG. 13 is bonded to the TFT array substrate 10 through the sealing material 52.

Besides the data line drive circuits 101 and the scanning line drive circuit 104, the TFT array substrate 10 may be provided with a sampling circuit for applying the video signal to the plurality of the data lines 6a at a predetermined timing, a precharge circuit for supplying a precharge signal at a predetermined voltage level to the plurality of the data lines 6a prior to the application of the video signal, and a test circuit for checking the quality and defects of the electro-optical device in the middle of the production or at the shipment thereof.

In each of the above-referenced exemplary embodiments shown in FIG. 1 through FIG. 14, the data line drive circuit 101 and the scanning line drive circuit 104 may be electrically and mechanically connected to a driver LSI mounted on a TAB (Tape Automated Bonding) board, through an anisotropically electrically conductive film arranged about the TFT array substrate 10, rather than mounting the data line drive circuit 101 and the scanning line drive circuit 104 on the TFT array substrate 10. Arranged on the light-incident side of the counter substrate 20 and the light-emitting side of the TFT array substrate 10 are respectively polarizer films, retardation films, and polarizers in predetermined directions to work with operation modes such as a TN mode, a VA mode, a PDLC (Polymer Dispersed Liquid Crystal) mode, and a normally white mode/a normally black mode.

When the electro-optical device of each of the above exemplary embodiments is incorporated in a projector, three panels of the electro-optical devices are used as RGB light valves, and each light valve receives the respective color light separated through RGB color separating dichroic mirrors. In each of the above exemplary embodiments, the counter substrate 20 is equipped with no color filter. Optionally, an RGB color filter may be arranged in a predetermined area facing the pixel electrode 9a having no light-shielding layer 23, on the counter substrate 20 along with a protective film. In this way, the electro-optical device of each embodiment finds applications in a direct viewing or reflective-type color electro-optical device, besides the liquid-crystal projector.

In each of the above exemplary embodiments, a light-shielding layer fabricated of a refractory metal may be mounted on the TFT array substrate 10 in a position facing the pixel switching TFT 30. The light-shielding layer mounted beneath the TFT 30 prevents a rear surface reflection from the TFT array substrate 10, or prevents projection light coming in from another electro-optical device penetrating a prism from entering the TFT 30 of the electro-optical device when a plurality of liquid-crystal devices are combined through prisms or the like. Microlenses may be arranged on the counter substrate 20 on a one-microlens-to-one-pixel basis. A color filter may be arranged on the underside of the RGB pixel electrode 9a on the TFT array substrate 10 using color resist. In this way, condensation efficiency to the incident light is increased, and an electro-optical device providing a bright image can be realized. By laminating interference layers having different refractive indexes on the counter substrate 20, a dichroic filter for creating the RGB colors may be formed, taking advantage of interference of light. The counter substrate with such a dichroic filter equipped makes an even brighter electro-optical device.

The present invention is not limited to the above exemplary embodiments, and changes are possible within the spirit and scope of the claims and the specification, and the method for the electro-optical device incorporating such changes and the electro-optical device fall within the technical scope of the present invention.

(Construction of the Electronic Equipment)

FIG. 15 shows electronic equipment incorporating the liquid-crystal device of each of the above exemplary embodiments, and includes a display information output source 1000, a display information processing circuit 1002, a display drive circuit 1004, an electro-optical device 100 such as a liquid-crystal display device, a clock generator circuit 1008, and a power source circuit 1010. The display information output source 1000 includes a memory, such as a ROM or a RAM, and a tuning circuit for outputting a video signal by tuning to the video signal in response to a clock signal from the clock generator circuit 1008. The display information processing circuit 1002 processes display information and outputs the processed display information in response to a clock signal from the clock generator circuit 1008. The display information processing circuit 1002 includes a variety of known processing circuits such as an amplifier and polarity inversion circuit, a serial-to-parallel converter circuit, a rotation circuit, a gamma correction circuit, and a clamp circuit. The display drive circuit 1004, including a scanning drive circuit and a data drive circuit, drives the electro-optical device 100. The power source circuit 1010 supplies power to each of the above units.

As examples of the electronic equipment having the above construction, FIG. 16 shows a projection display apparatus, and FIG. 17 shows a multimedia personal computer (PC) or an engineering workstation (EWS).

FIG. 16 shows the general construction of the major components of the projection display apparatus. There are shown a light source 1102, dichroic mirrors 1108, reflective mirrors 1106, an entrance lens 1122, a relay lens 1123, an exit lens 1124, liquid-crystal light valves 100R, 100G, and 100B, a cross-dichroic prism 1112, and a projection lens 1114. The light source 1102 is composed of a lamp such as a metal halide lamp and a reflector for reflecting light from the lamp. A blue and green light reflecting dichroic mirror 1108 transmits red light component of the light beams from the light source 1102, while reflecting blue light component and green light component. The transmitted red light component is reflected from a reflective mirror 1106, and is incident on the red-color liquid-crystal light valve 100R. The green light component of light reflected from the blue and green light reflecting dichroic mirror 1108 is reflected from a green light reflecting dichroic mirror 1108, and is incident on the green-color liquid-crystal light valve 100G. The blue light component is then transmitted through the green light reflecting dichroic mirror 1108. A light guide 1121, including a relay lens system composed of the entrance lens 1122, the relay lens 1123, and the exit lens 1124, is arranged for the blue light component to avoid light loss in a long light path thereof, and via the light guide 1121, the blue light component is incident on the blue-color liquid-crystal light valve 100B. Three color light rays modulated through the light valves are incident on the cross-dichroic prism 1112. This prism is constructed by gluing four right-angle prisms with a red-light reflecting dielectric multilayer film and a blue-light reflecting dielectric multilayer film interposed between interfaces thereof in a cross configuration. These dielectric multilayer films synthesize the three color light rays to form light indicating a color image. The projection lens 1114 constituting a projection optical system projects the synthesized light onto a screen, thereby enlarging and displaying the image on a screen 1120.

The personal computer 1200 shown in FIG. 17 includes a main unit 1204 provided with a keyboard 1202, and a electro-optical device 100.

The present invention is not limited to the above exemplary embodiments, and changes are possible within the spirit and scope of the claims and the specification, and the method for the electro-optical device incorporating such changes and the electro-optical device fall within the technical scope of the present invention.

What is claimed is:

1. An electro-optical device comprising:
   a first substrate having an alignment layer that has been subjected to a rubbing process,
   a second substrate, opposed to the first substrate and having an alignment layer that has been subjected to a rubbing process,
   an electro-optical material interposed between the first substrate and the second substrate,
   a step portion, formed in the surface of the alignment layer of at least one of the first substrate and the second substrate, and downwardly rubbed in the direction of the rubbing process, and
   a light shield layer formed in an area facing the step portion that is downwardly rubbed in the direction of the rubbing process, on at least one of the first substrate and the second substrate,
   wherein $0.5D < W1$ and $d1 + 300$ nm $< D$
   wherein D is a thickness of the electro-optical material between the first substrate and the second substrate, except the step portion, W1 is a spacing between adjacent pixel electrodes, and d1 is a thickness of the electro-optical material at the step portion between the first substrate and the second substrate.

2. The electro-optical device according to claim 1, wherein the step portion is at a hollow portion that is formed to extend in a direction intersecting the direction of the rubbing process.

3. The electro-optical device according to claim 2, wherein the hollow portion is a groove formed in one of the first substrate and the second substrate, and a line is arranged in the area of the groove.

4. The electro-optical device according to claim 3, wherein the upwardly rubbed portion of the hollow portion which is upwardly rubbed in the direction of the rubbing process is not opposed to the light shield layer.

5. The electro-optical device according to claim 1, wherein one of the first substrate and the second substrate comprises a plurality of pixel electrodes, and an area of the substrate corresponding to the spacing between adjacent pixel electrodes which are driven in the same polarity is subjected to a planarizing process.

6. The electro-optical device according to claim 5, wherein the planarizing process is performed by forming a groove in the substrate and arranging a line in the area of the groove.

7. The electro-optical device according to claim 5, wherein the distance between the adjacent pixel electrodes which are driven in the same polarity is larger than the layer thickness of the electro-optical material.

8. The electro-optical device according to claim 1, wherein the direction of the rubbing process is perpendicular to the downwardly rubbed portion of the step portion.

* * * * *